US006554043B2

(12) United States Patent
Simone

(10) Patent No.: US 6,554,043 B2
(45) Date of Patent: Apr. 29, 2003

(54) APPARATUS FOR AUTOMATICALLY APPLYING SEALANT MATERIAL IN AN INSULATED GLASS ASSEMBLY

(76) Inventor: Albert A. Simone, 8 Reinhart Way, Bridgewater, NJ (US) 08807

( * ) Notice: Subject to any disclaimer, the term of this patent is extended or adjusted under 35 U.S.C. 154(b) by 55 days.

(21) Appl. No.: 09/873,692

(22) Filed: Jun. 5, 2001

(65) Prior Publication Data

US 2002/0108696 A1 Aug. 15, 2002

Related U.S. Application Data

(63) Continuation of application No. 09/298,365, filed on Apr. 23, 1999, now abandoned.

(51) Int. Cl.[7] ................................................ B32B 31/06
(52) U.S. Cl. ........................ 156/539; 156/107; 156/109
(58) Field of Search .......................... 156/99, 107, 109, 156/538–539, 556, 558, 559; 428/34; 52/786.1, 786.11, 786.13, 788.1, 204.5

(56) References Cited

U.S. PATENT DOCUMENTS 4,546,723 A * 10/1985 Leopold et al. ............. 118/669
4,708,762 A * 11/1987 Lenhardt ..................... 156/556
5,167,756 A * 12/1992 Lenhardt ..................... 156/578

* cited by examiner

*Primary Examiner*—Michael W. Ball
*Assistant Examiner*—Jessica Rossi
(74) *Attorney, Agent, or Firm*—Ezra Sutton

(57) ABSTRACT

An apparatus is provided for applying sealant material to an insulated glass panel assembly having first, second, third and fourth edges for receiving sealant material therein, which includes a sealant assembly for applying sealant material to the insulated glass panel assembly. A glass advance assembly is provided for advancing and moving forward the insulated glass panel assembly into the sealant assembly for applying sealant material thereto. The sealant assembly for applying sealant material includes a first sealant dispensing assembly and a second sealant dispensing assembly for applying sealant material to the first, second, third and fourth edges of the insulated glass panel assembly. The apparatus further includes an upper head slide sub-assembly for moving the first sealant dispensing assembly in an upward vertical direction for applying sealant material to the first edge of the insulated glass panel assembly, and in a downward vertical direction parallel to the upward direction for applying sealant material to the third edge of the insulated glass panel assembly. The apparatus also includes a pinch roller assembly for moving the insulated glass panel assembly through the sealant assembly while the first and second sealant dispensing assemblies are applying sealant material to the second and fourth edges of the insulated glass panel assembly, respectively. Additionally, the apparatus includes an output roller assembly for moving the sealed insulated glass panel assembly out of the sealant assembly.

24 Claims, 24 Drawing Sheets

APPARATUS FOR AUTOMATICALLY APPLYING SEALANT MATERIAL IN AN INSULATED GLASS ASSEMBLY

This application is a continuation of U.S. application Ser. No. 09/298,365, filed Apr. 23, 1999, now abandoned.

FIELD OF THE INVENTION

The present invention relates to an improved apparatus for automatically applying sealant material in an insulated glass assembly. More particularly, it relates to an apparatus that automatically changes its alignment criteria for different sizes of air spaces and also allows for differences in the sealant space caused by improper positioning of the spacer when manufacturing an insulated glass assembly.

BACKGROUND OF THE INVENTION

Insulating glass includes an assembly of two sheets or panels of glass separated by one or more spacers so that there is a layer of insulating air between the two panels of glass. To seal in the insulating layer of air, a sealant material must be applied to each edge of the glass panels in the space formed between the spacer and the edges of the glass panels. In order to form a good seal, the two glass panels must be accurately aligned relative to each other, and, in addition, the spacer along each edge of the glass assembly must be properly spaced and aligned relative to the two glass panels. As a still further condition for forming a good seal, the glass assembly and spacers must be maintained in proper alignment while the sealant material is being applied thereto. Finally, the sealant material must be applied in such a way that it is uniform and covers the entire edge of the glass assembly.

The application of adhesive or other sealant material to substrates is well known and is particularly well known in the field of insulated glass assembly production. In the manufacturing of insulated glass, it is important to insure that the perimeter of a unit is completely sealed. If this is not done, the result is the ingress of moisture or debris which eventually leads to the premature degradation of an insulated glass assembly.

In view of this difficulty, the prior art has proposed numerous methods and various apparatus to insure uniform application of sealant material in the assemblies. Typical of the known arrangements are extrusion heads which are either automated or manual. One of the primary difficulties of the known arrangements is that the depth of the sealant material cannot be uniformly applied in width or depth about the perimeter. Further, the known arrangements are limited in that they do not positively avoid entrapment of air within the sealant material. A further limitation is that the most extreme perimeter of the sealant material cannot be perfectly perpendicular relative to the substrate surface. The result is surface irregularity about the perimeter as opposed to a smooth planar finish which is more desirable from an aesthetic point of view as well as from a structural point of view.

Although apparatus has been developed in the past for handling insulating glass assemblies and applying sealant material to the edges, such apparatus has not been totally satisfactory. In one prior art system, a stationary header applies the sealant material to the glass assembly as it moves along a work support. However, one of the problems of such an arrangement is that it is difficult to keep the glass assembly and spacers properly aligned, relative to each other as it moves relative to the stationary header. As a result, defects in the seal are likely to occur.

In another prior art arrangement, the sealant material is applied to a frame formed by aluminum spacers, and then the spacer frame with the sealant material applied thereto is taken to another station where the glass panels are adhered to the spacer frame. The glass assembly is then transferred to a vertically arranged heating and compression station to heat and compress the assembly. Such an arrangement is time consuming, expensive, requires many work stations and is not automatic. Accordingly, this system has also not been entirely satisfactory.

In view of the existing limitations in the sealant applying art, there exists a need for an improved method and apparatus for applying sealant to insulated glass assemblies.

DESCRIPTION OF THE PRIOR ART

Apparatus for automatically applying sealant material in an insulated glass assembly of various designs and configurations have been disclosed in the prior art. For example, U.S. Pat. No. 5,650,029 to LAFOND discloses a method for applying sealant material between spaced-apart substrates in an insulated glass assembly using extrusion nozzles and smoothing plates. The smoothing plates move in concert with the extrusion nozzles to insure the uniform distribution of the sealant material from the spacer to the perimeter of the substrates. The smoothing plates insure a uniform and planar surface at the perimeter. This method of sealant application to the insulated glass assembly is automated, and accordingly, the sealant is applied in an expedited manner with a high degree of precision of uniformity. This prior art patent does not disclose or teach the particular structure and design of the present invention of an apparatus that automatically applies sealant material between glass panels in an insulated glass assembly.

U.S. Pat. No. 4,826,547 to LENHARDT discloses a process and apparatus for applying a sealing mass to seal the space between panels of insulating glass using a sealing nozzle. The apparatus includes at least one sealing nozzle and at least one covering and stripping plate. The stripping plate permits defect-free and bubble-free filling with a sealing material, even in the corner areas, in a uniform manner. This prior art patent does not disclose or teach the particular structure and design of the present invention of an apparatus that automatically applies sealant material between glass panels in an insulated glass assembly.

U.S. Pat. No. 4,295,914 to CHECKO discloses an apparatus for applying sealant material to an insulated glass assembly. The apparatus includes a work supporting table for receiving the glass assembly, and an aligning apparatus for properly orienting and aligning the glass panels and spacers of the glass assembly relative to each other and relative to a sealant applying nozzle/head. The sealant applying apparatus also includes a clamping assembly having clamping members for clamping the glass assembly in order to maintain the glass assembly in its properly aligned position so that the sealant material can be applied to the space between the perimeter edges of the glass assembly. The sealant applying head is mounted for movement relative to an edge of the glass assembly which includes a nozzle assembly for applying the sealant material to the glass assembly as it moves relative to it. This prior art patent does not disclose or teach the particular structure and design of the present invention of an apparatus that automatically applies sealant material between glass panels in an insulated glass assembly.

U.S. Pat. Nos. 4,110,148; 4,145,237; 4,561,929; and 4,711,692 disclose other apparatus for sealing the edges of an insulated glass assembly with a sealant or adhesive material.

None of the prior art patents disclose or teach the design, structure and configuration of the present invention of an apparatus that automatically applies sealant material between glass panels in an insulated glass assembly. Further, the prior art patents do not disclose or teach the overall apparatus of the present invention that automatically applies sealant material to an insulated glass assembly having motorized dispensing nozzles with automatic valving; automatic size detection sensors; and pinch rollers to drive the glass panel assembly forward.

Accordingly, it is an object of the present invention to provide of an improved apparatus that automatically applies sealant material around the perimeter of an insulated glass assembly consisting of two panels of glass separated by a spacer.

Another object of the present invention is to provide an apparatus that automatically applies sealant material in an insulated glass assembly wherein the apparatus automatically or manually changes its alignment criteria for different sizes of air spaces, and allows for differences in the sealant space caused by improper positioning of the spacer when manufacturing the insulated glass assembly.

Another object of the present invention is to provide an apparatus that automatically applies sealant material in an insulated glass assembly wherein the apparatus includes a vertical or horizontal platform having a plurality of input rollers thereon, and a pair of motorized dispensing nozzle heads having automatic valving thereon.

Another object of the present invention is to provide an apparatus that automatically applies sealant material in an insulated glass assembly, wherein the apparatus contains two (2) sets of dispensing nozzle heads, so that one of the sets of dispensing nozzle heads moves around three (3) sides of the insulated glass assembly to apply the sealant material, and the other dispensing nozzle head moves along the fourth side of the insulated glass assembly to apply the sealant material thereto.

Another object of the present invention is to provide an apparatus that automatically applies sealant material in an insulated glass assembly wherein the apparatus further includes heated nozzles for keeping a corner hot during the application of the hot sealant material between the space formed by the pair of glass panels in order to avoid a cold joint during the sealing operation which provides a more uniform sealant application.

Another object of the present invention is to provide an apparatus that automatically applies sealant material in an insulated glass assembly wherein the apparatus also includes automatic (non-contact) size detection sensors for measuring the width and height of the insulated glass unit as it is being sealed.

Another object of the present invention is to provide an apparatus that automatically applies sealant material in an insulated glass assembly wherein the apparatus additionally includes a pair of pinch rollers thereon for keeping the insulated glass unit together in order to avoid sealant material from entering the air space between the glass panels and also provides for the lateral movement of the glass panels during the sealing process.

Another object of the present invention is to provide an apparatus that automatically applies sealant material in an insulated glass assembly wherein the dispensing nozzle heads are designed to change the alignment of the apparatus for different sizes of air spaces in order to eliminate expensive, complex and elaborate motion detector systems.

Another object of the present invention is to provide an apparatus that automatically applies sealant material in an insulated glass assembly wherein the dispensing nozzle heads are also designed to allow for differences in the sealant space which are caused by improper positioning of the spacer in order to eliminate the need for expensive, complex and elaborate space feedback sensors or space feedback mechanisms in the sealant applying apparatus of the present invention.

Another object of the present invention is to provide an apparatus that automatically applies sealant material in an insulated glass assembly wherein the dispensing nozzle heads, being at least two, allows for faster sealing of the insulated glass assembly as both the top and bottom sides of the glass assembly are sealed simultaneously using the two dispensing nozzle heads.

Another object of the present invention is to provide an apparatus that automatically applies sealant material in an insulated glass assembly which works for different sizes, shapes and thicknesses of glass units, with the benefit of increased efficiency due to lower maintenance and labor costs during change-overs for different sizes, shapes or thicknesses of the insulated glass assembly.

Another object of the present invention is to provide an apparatus that automatically applies sealant material in an insulated glass assembly that utilizes an integrated electric system which automatically adjusts for the glass unit thickness chosen, thereby effectively eliminating operator error and variations for the different glass unit thicknesses of the insulated glass assembly being produced.

Another object of the present invention is to provide an apparatus that automatically applies sealant material in an insulated glass assembly that minimizes down time and labor costs by enabling quick removal of jams, defective glass units or misapplied sealant materials to the glass unit during the operational use of the apparatus.

Another object of the present invention is to provide an apparatus that automatically applies sealant material in an insulated glass assembly that minimizes change-over time and set-up time by automatically and simultaneously adjusting the positions of the dispensing nozzle heads in regard to the glass units being processed.

A further object of the present invention is to provide an apparatus that automatically applies sealant material in an insulated glass assembly that is simple to manufacture and assemble and is also more cost efficient during operational use.

SUMMARY OF THE INVENTION

In accordance with the present invention, there is provided an apparatus for applying sealant material to an insulated glass panel assembly having first, second, third and fourth edges for receiving sealant material therein, having a sealant assembly for applying sealant material to the insulated glass panel assembly. A glass advance assembly is provided for advancing and moving forward the insulated glass panel assembly into the sealant assembly for applying sealant material thereto. The sealant assembly for applying sealant material includes a first sealant dispensing assembly and a second sealant dispensing assembly for applying sealant material to the first, second, third and fourth edges of the insulated glass panel assembly. The apparatus further includes an upper head slide sub-assembly for moving the first sealant dispensing assembly in an upward vertical direction for applying sealant material to the first edge of the insulated glass panel assembly, and in a downward vertical direction parallel to the upward direction for applying sealant material to the third edge of the insulated glass panel assembly. The apparatus also includes a pinch roller assembly for moving the insulated glass panel assembly through the sealant assembly while the first and second sealant dispensing assemblies are applying sealant material to the second and fourth edges of the insulated glass panel assembly, respectively. Additionally, the apparatus includes an output roller assembly for moving the sealed insulated glass panel assembly out of the sealant assembly.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Overview

Figure 1:
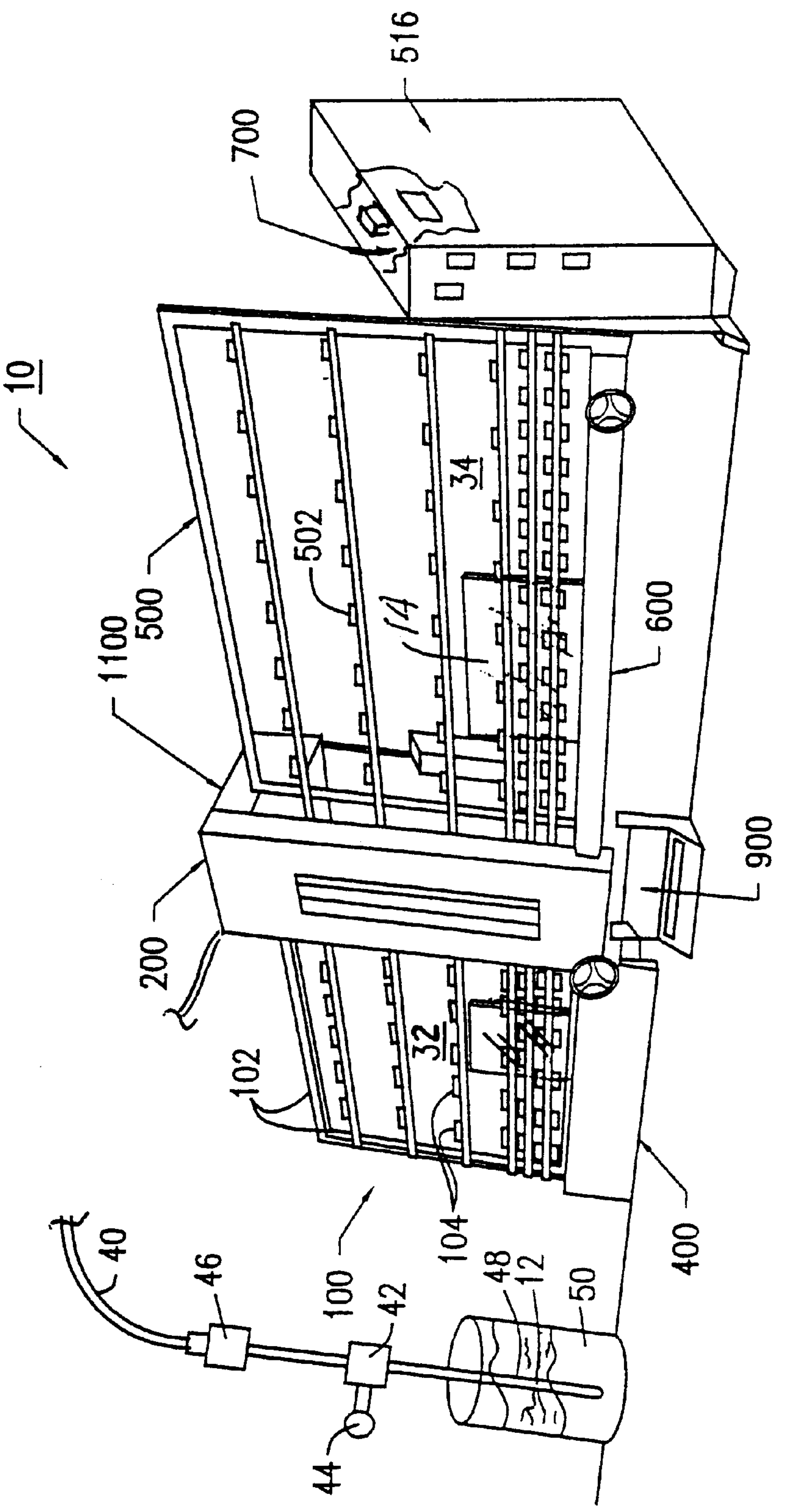
FIG. 1 is a front perspective view of the automated glass sealing apparatus of the preferred embodiment of the present invention showing the major component assemblies contained therein and in operational use.

The automated glass sealing apparatus 10 and its component assemblies of the preferred embodiment are represented in detail by FIGS. 1 through 16B of the drawings. The automated glass sealing apparatus 10 is used for automatically applying sealant material 12 in an insulated glass assembly 14 consisting of two panels of glass 16 and 18 separated by a metal or plastic spacer 20. More particularly, the sealant material 12 must be evenly applied to the spacer 20 such that the wiper plate assembly 1300 or 1320 wipes off any excess sealant material 12 from the nozzles 318 and 916 at the final corner of glass panel assembly 14.

The automated glass sealing apparatus 10 of the present invention, as shown in FIGS. 1 to 16, comprises an input frame assembly 100; a pinch roller assembly 200; an upper dispensing head assembly 300; a glass advance assembly 400; an output frame assembly 500; an output roller assembly 600; an electronic control system 700; an electro-pneumatic system 800; a lower dispensing head assembly 900; a swivel assembly 1000; a pinch roller drive assembly 1100; an upper dispense head slide assembly 1200; and a wiper plate assembly 1300.

Input Frame Assembly 100

Figure 2A:
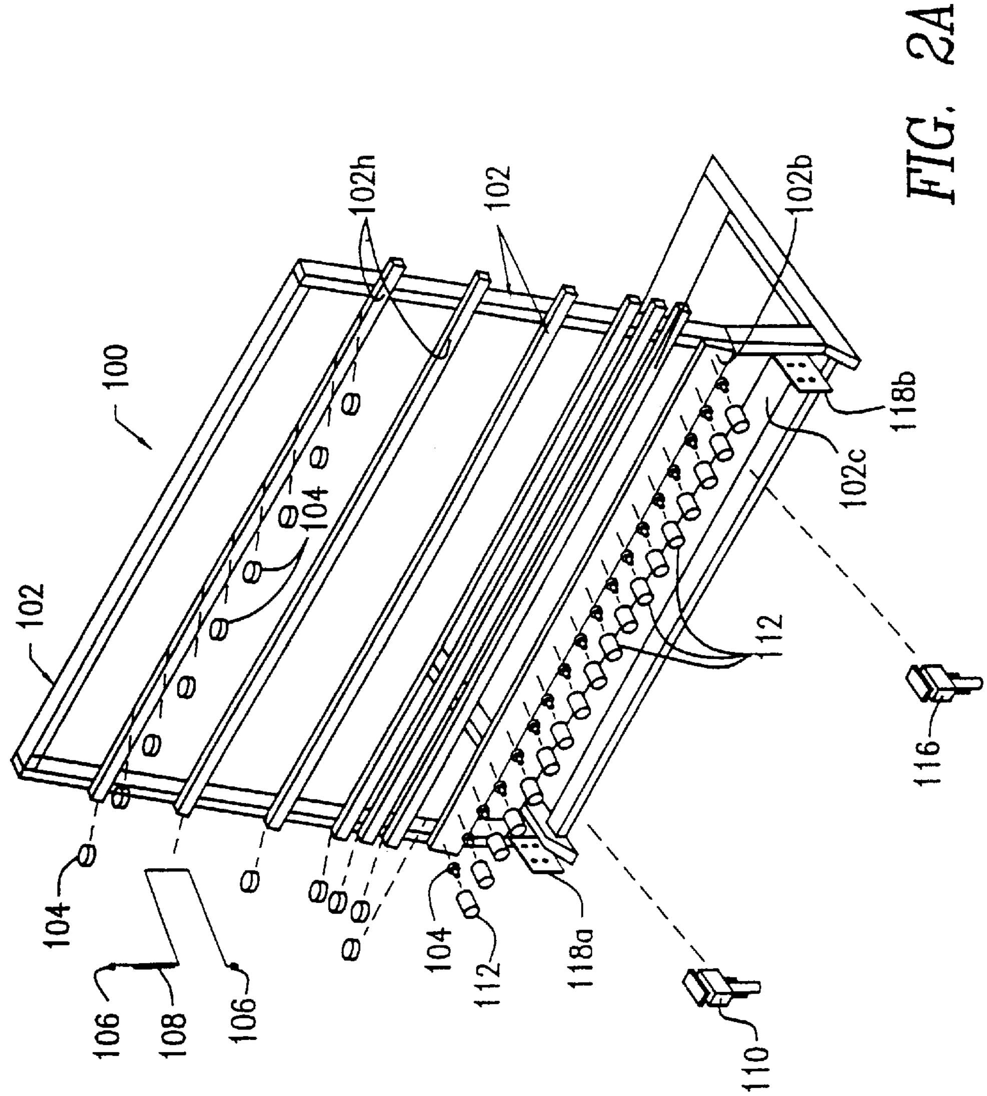
FIG. 2A is an exploded front perspective view of the automated glass sealing apparatus of the present invention showing the input frame assembly and its component parts contained therein.
Figure 2B:
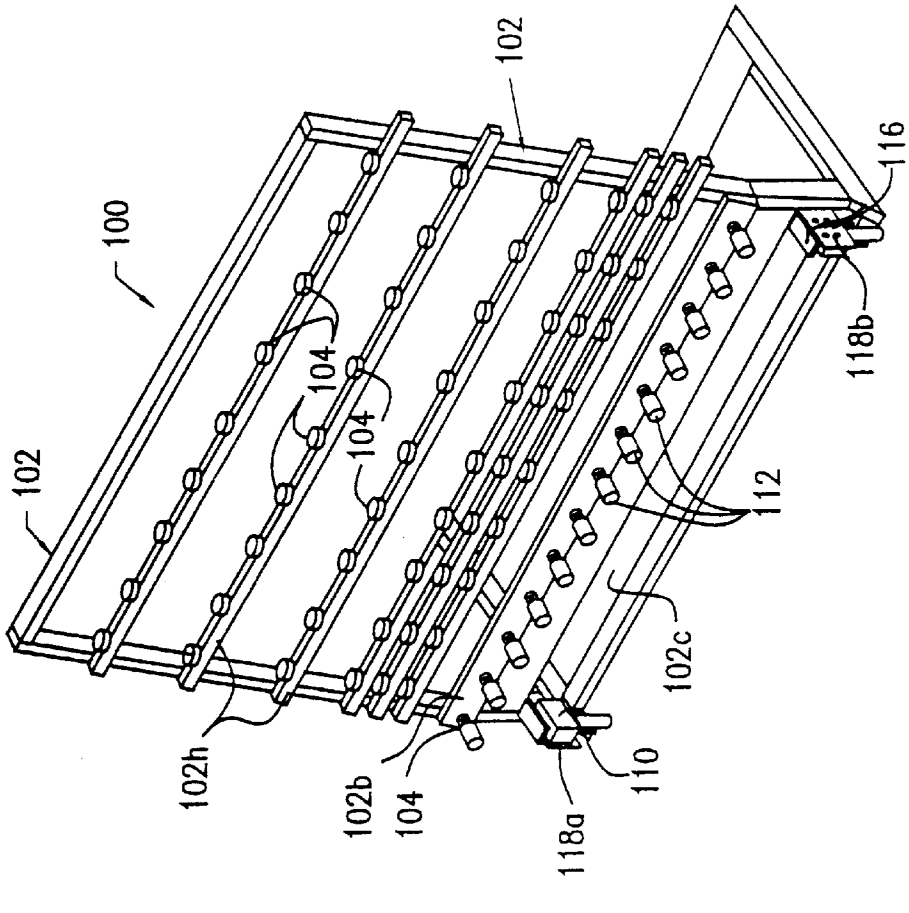
FIG. 2B is a front perspective view of the automated glass sealing apparatus of the present invention showing the input frame assembly and its component parts contained thereon.

The input frame assembly 100, as depicted in detail by FIGS. 1, 2A, 2B, 3A and 3B, is used as the staging area 32 for the insulated glass assembly 14 having a pair of glass panels 16 and 18 prior to entering the sealing area 30. The input frame assembly 100 is substantially rectangular in shape and provides for the mounting of the glass assembly 14 prior to the sealant material 12 being inserted into the spacer frame 20. The input frame assembly 100 includes a substantially rectangular-shaped input frame 102 having a plurality of rollers 104 attached to the horizontal bars 102*h* of input frame 102. Rollers 104 are evenly-spaced apart along horizontal bars 102*h*. Each roller 104 is secured to horizontal bar 102*h* by a pair of roller axle rod retainers 106 being attached to roller axle rod 108, as depicted in FIG. 2A. The input frame assembly 100 further includes a plurality of input rollers 112 and input roller axles 114 being attached to the horizontal bar 102*b* of input frame 102. Input rollers 112 are evenly-spaced apart along horizontal bar 102*b*. Each input roller 112 is secured to horizontal bar 102*b* by an input roller axle 114. Additionally, input frame assembly 100 also includes a left-side pneumatic slide 110 and a right-side pneumatic slide 116 being attached to L-shaped brackets 118*a* and 118*b*, respectively, on horizontal bar 102*c* of input frame 102. Pneumatic slides 110 and 116 push up against the glass advance belt 414, and belt 414 is in contact with the plurality of input rollers 112 so that glass panel assembly 14 moves forward (left to right) to the pinch roller assembly 200.

Pinch Roller Assembly 200

Figure 3A:
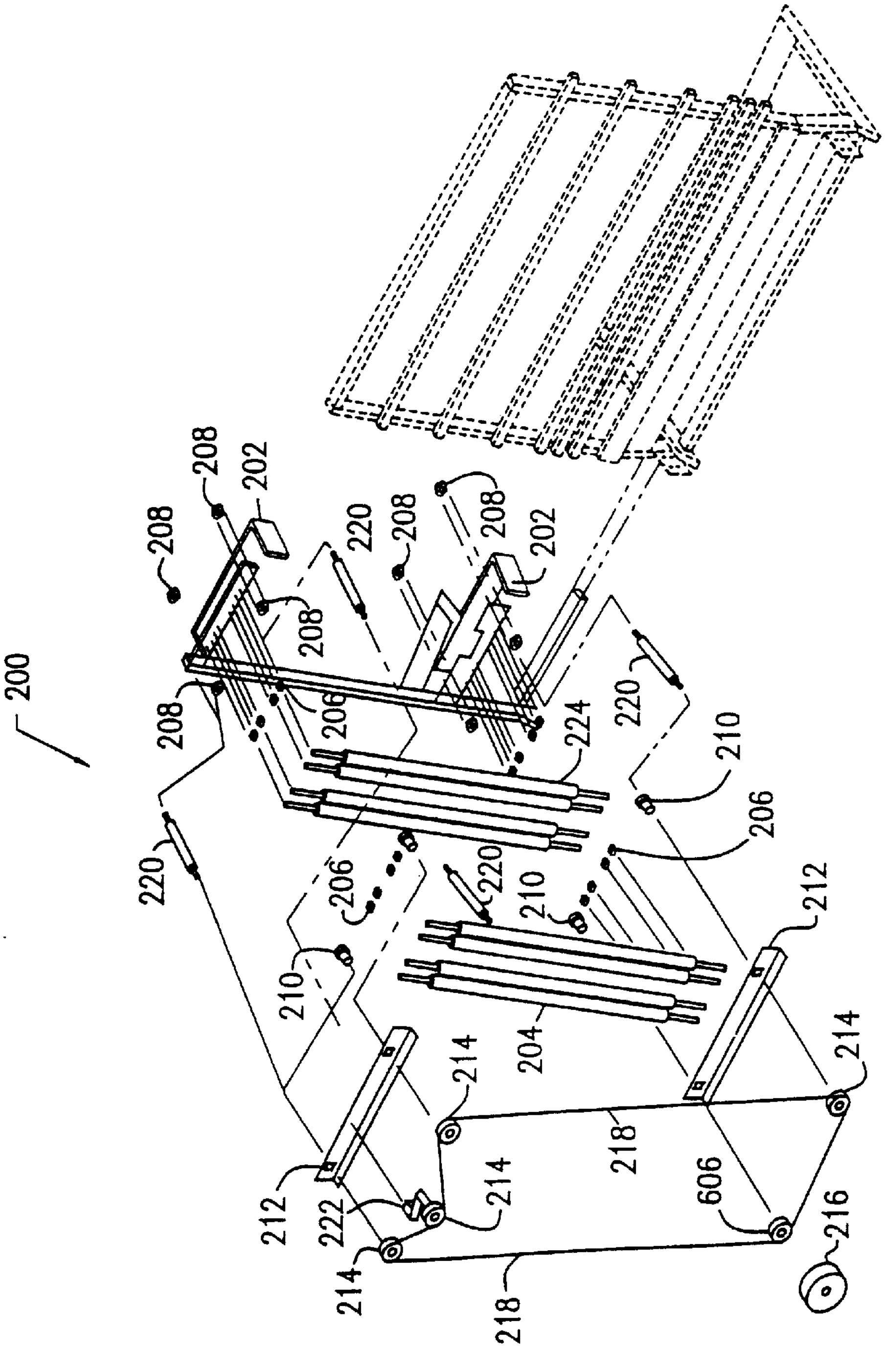
FIG. 3A is an exploded front perspective view of the automated glass sealing apparatus of the present invention showing the pinch roller assembly and its component parts being attached to the input frame assembly.
Figure 3B:
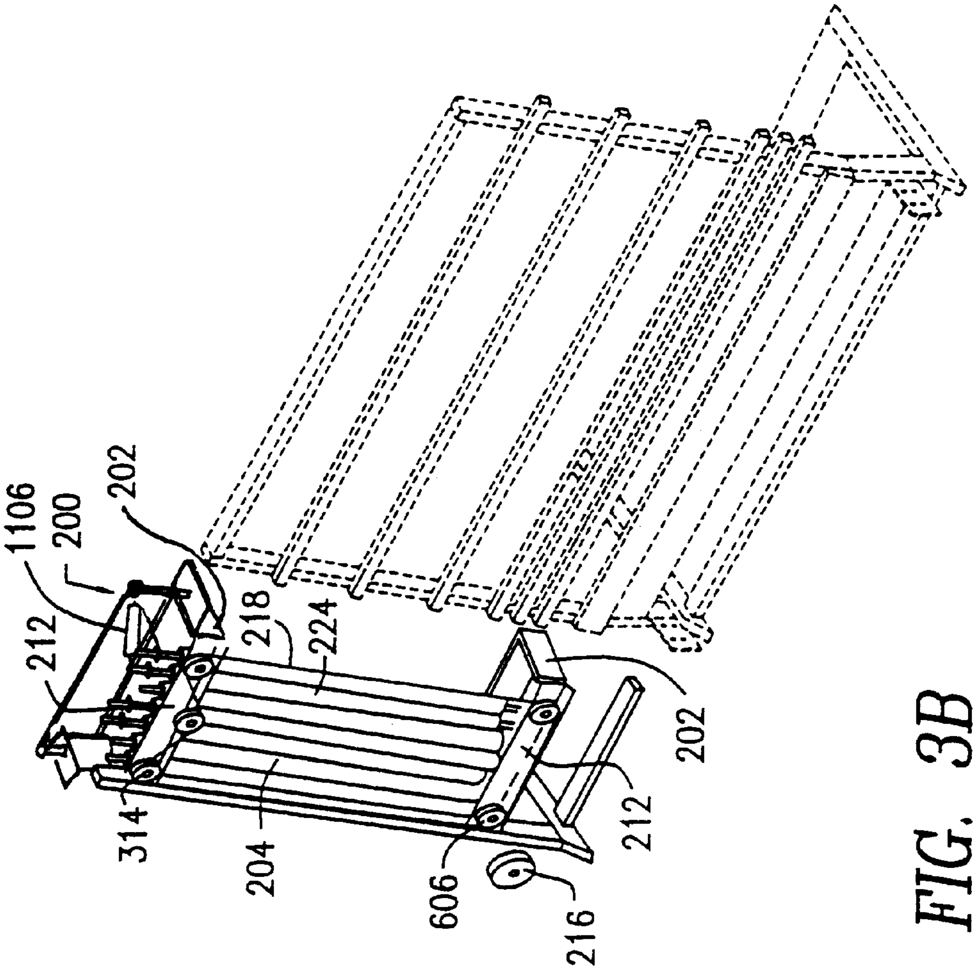
FIG. 3B is a front perspective view of the automated glass sealing apparatus of the present invention showing the pinch roller assembly and its component parts attached to the input frame assembly in an assembled configuration.

The pinch roller assembly 200, as shown in FIGS. 3A and 3B, is used for securing the insulated glass assembly 14 and moving it horizontally through the sealing area 32 of the automated glass sealing apparatus 10. The pinch roller assembly 200 has an adjustment feature being the pinch adjustment wheel 216 to accommodate the thickness of various spacer frames 22 of the insulated glass assembly 14. The pinch roller assembly 200 includes a substantially rectangular-shaped pinch roller frame 202 having a plurality of front and rear pinch rollers 204 and 224 attached thereto. Each pinch roller 204 is connected to the outer roller mounting angles 212 using pinch roller bearings 206 and pinch adjust bearings 208, respectively. Each pinch roller 224 is connected to pinch roller frame 202 using pinch roller bearings 206 and pinch adjust bearings 208, respectively. The pinch roller assembly 200 further includes a plurality of ball nuts 210, a pair of outer roller mounting angles 212, a plurality of sprockets 214, a pinch adjusting wheel 216 (for adjusting assembly 200 for different thicknesses of the glass panel assembly 14), a chain 218, a ball screw 220 and a chain tensioner 222. Component parts 210 to 222 function together such that the front pinch rollers 204 which are connected to the mounting angles 212 will change their distance from the rear rollers 224.

Upper Dispensing Head Assembly 300

Figure 4B:
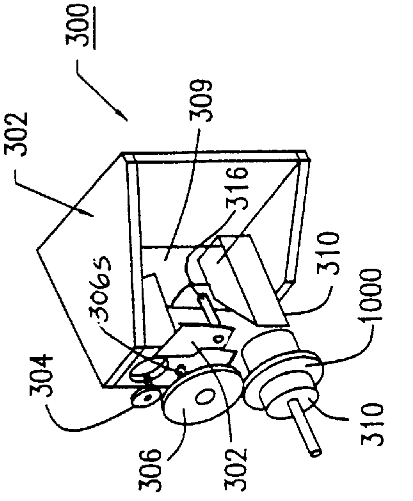
FIG. 4B is a front perspective view of the automated glass sealing apparatus of the present invention showing the upper dispensing head assembly and its component parts in an assembled configuration.
Figure 4A:
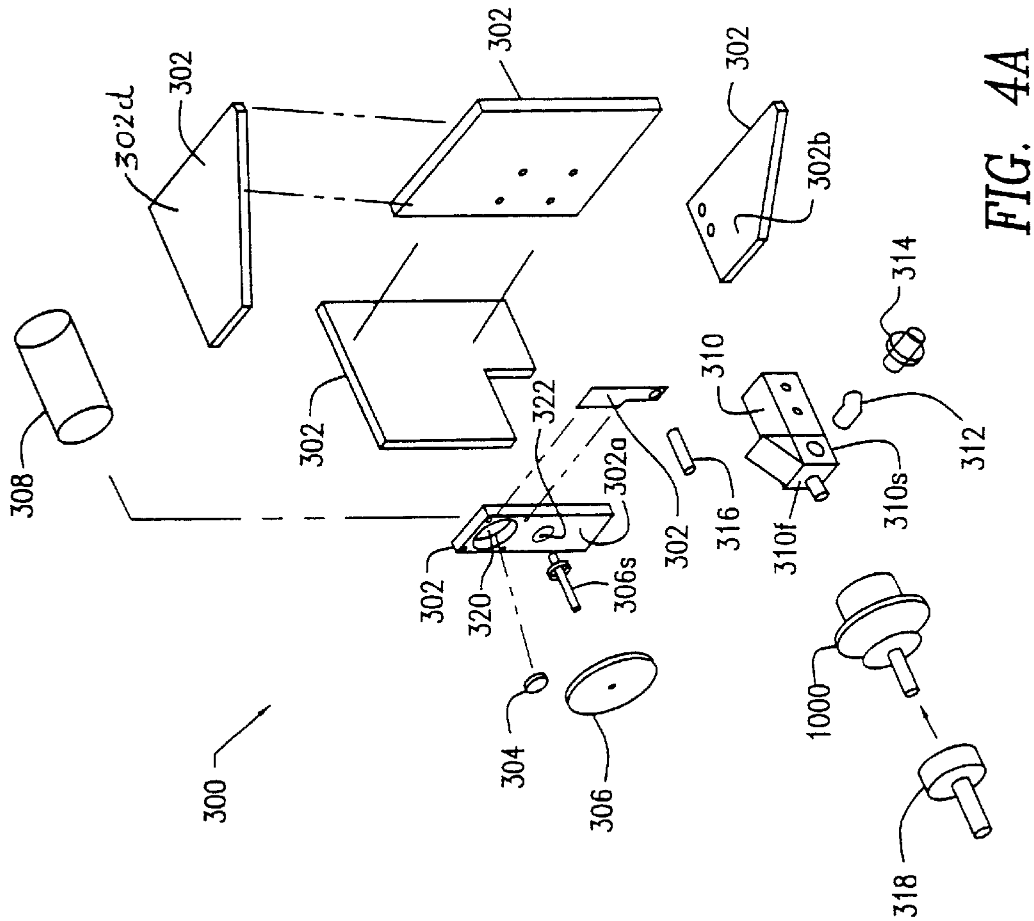
FIG. 4A is an exploded front perspective view of the automated glass sealing apparatus of the present invention showing the upper dispensing head assembly and its component parts contained therein.
Figure 13A:
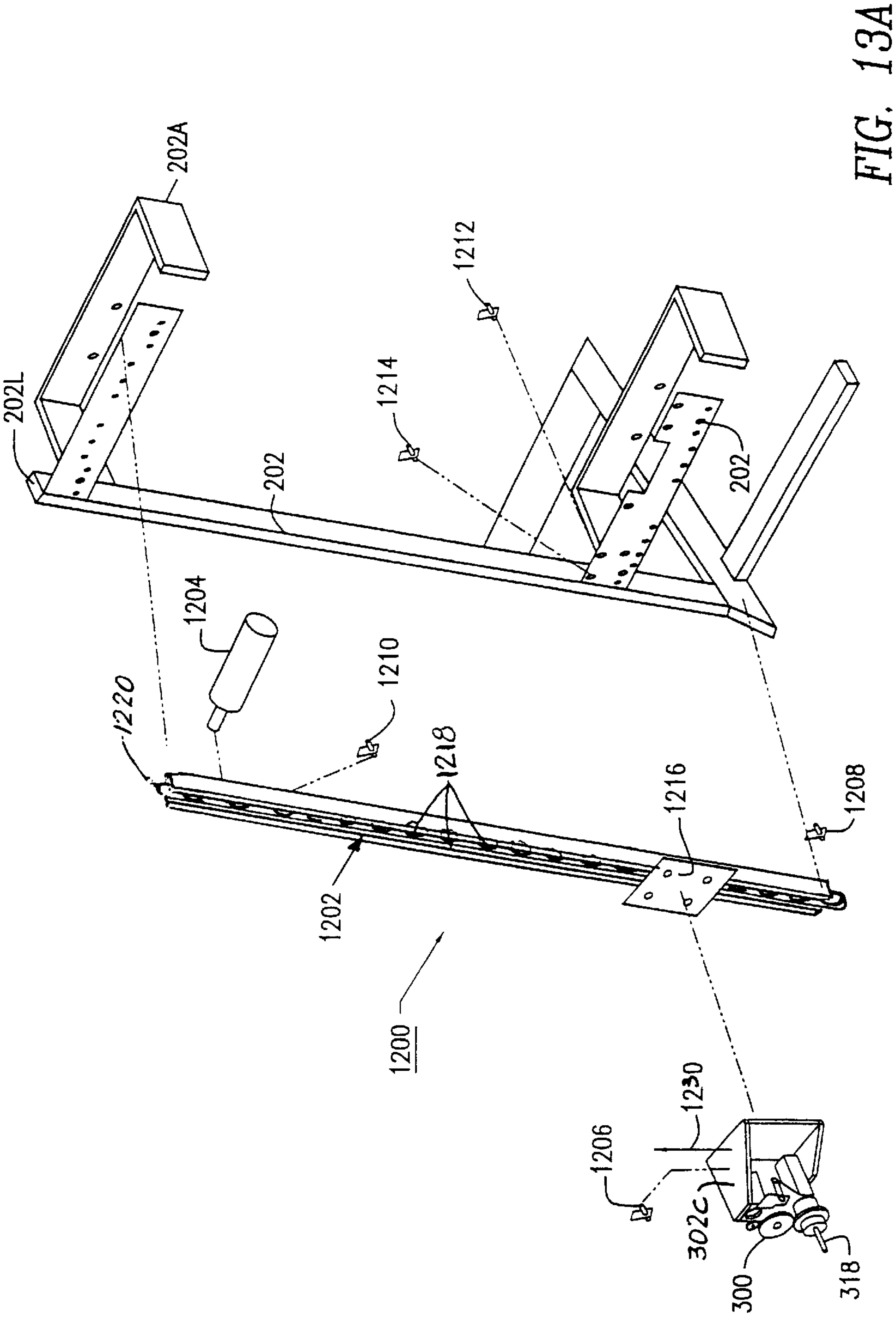
FIG. 13A is an exploded front perspective view of the automated glass sealing apparatus of the present invention showing the upper dispense head slide assembly and its component parts contained thereon.
Figure 13B:
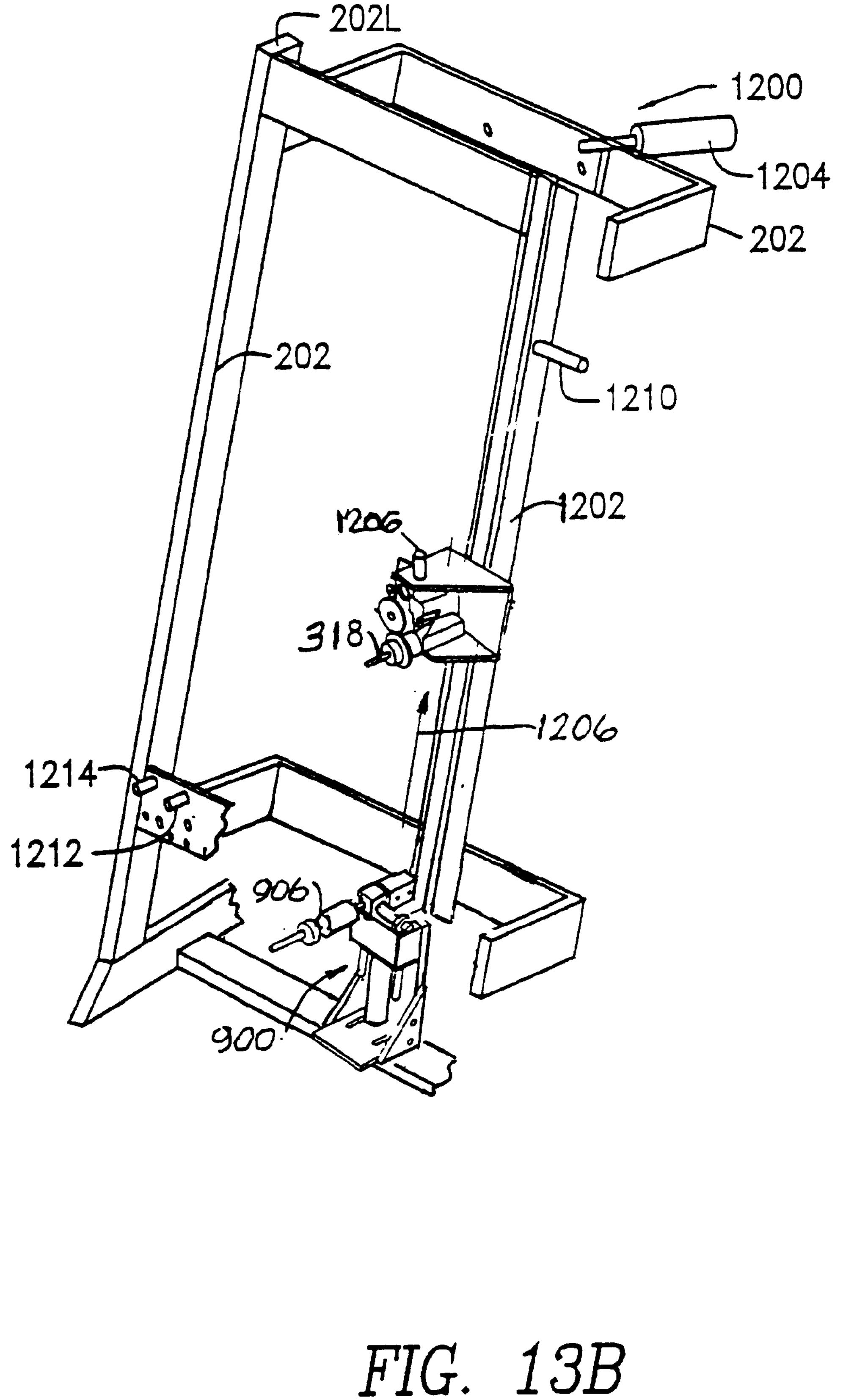
FIG. 13B is a front perspective view of the automated glass sealing apparatus of the present invention showing the upper dispense head slide assembly and its component parts in an assembled configuration.

The upper dispensing head assembly 300, as depicted in FIGS. 4A, 4B and 13B of the patent drawings, is used for depositing and applying a sealant material 12 evenly around the perimeter (three sides) within the air space 26 of the insulated glass assembly 14 consisting of two panels of glass 16 and 18 separated by a spacer frame 20. The upper dispensing head assembly 300 includes a plurality of mounting plates 302, a mounting gear 304 being attached to servomotor 308 through mounting opening 320 of mounting plate 302*a*, and a middle gear 306 with a gear shaft 306*s* being attached to mounting plate 302 through mounting opening 322 therein. The upper dispensing head assembly 300 further includes a dispensing valve 310 connected to mounting plate 302*b* having a pipe elbow 312 and hose adapter 314 attached to the side 310*s* of dispensing valve 310 and the swivel home sensor 316. Swivel home sensor 316 is used to sense when the swivel assembly is at its start position. The swivel assembly 1000 is attached to the front surface wall 310*f* of dispensing valve 310 with the dispensing nozzle 318 attached in turn to the swivel assembly 1000, as depicted in FIGS. 4A and 4B of the drawings.

Glass Advance Assembly 400

Figure 5A:
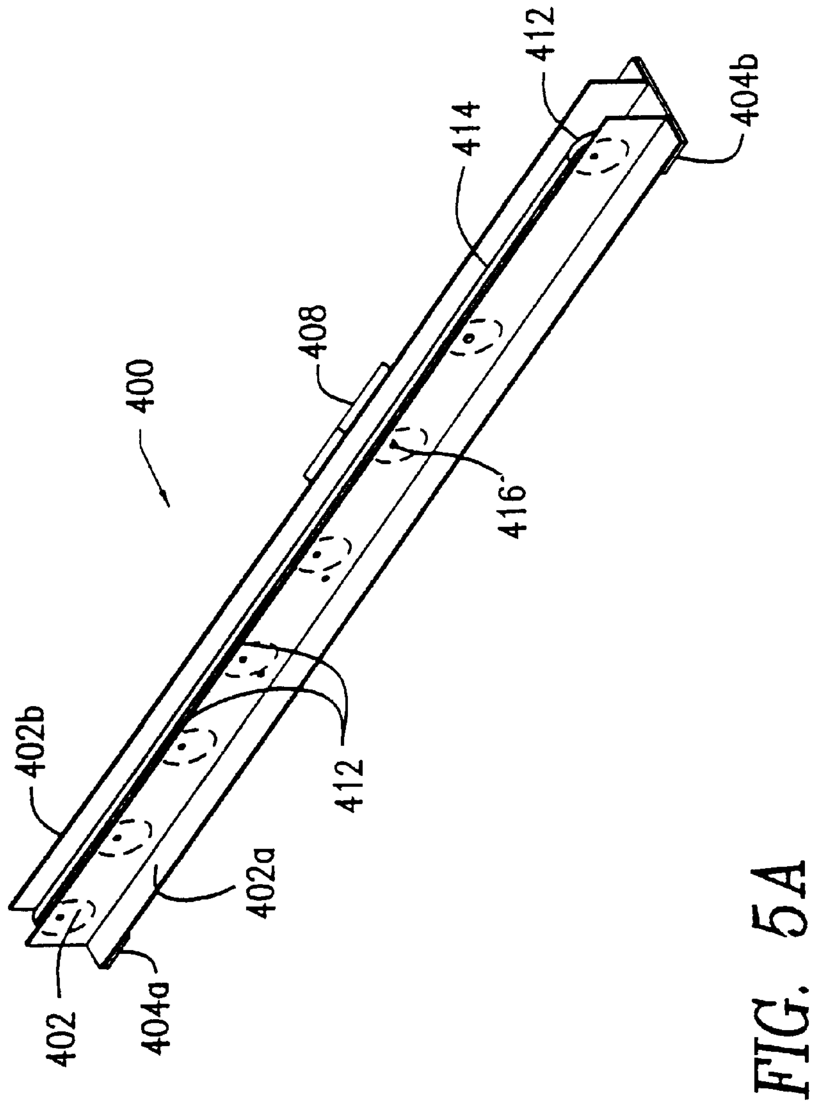
FIG. 5A is an exploded front perspective view of the automated glass sealing apparatus of the present invention showing the glass advance assembly and its component parts contained therein.
Figure 5B:
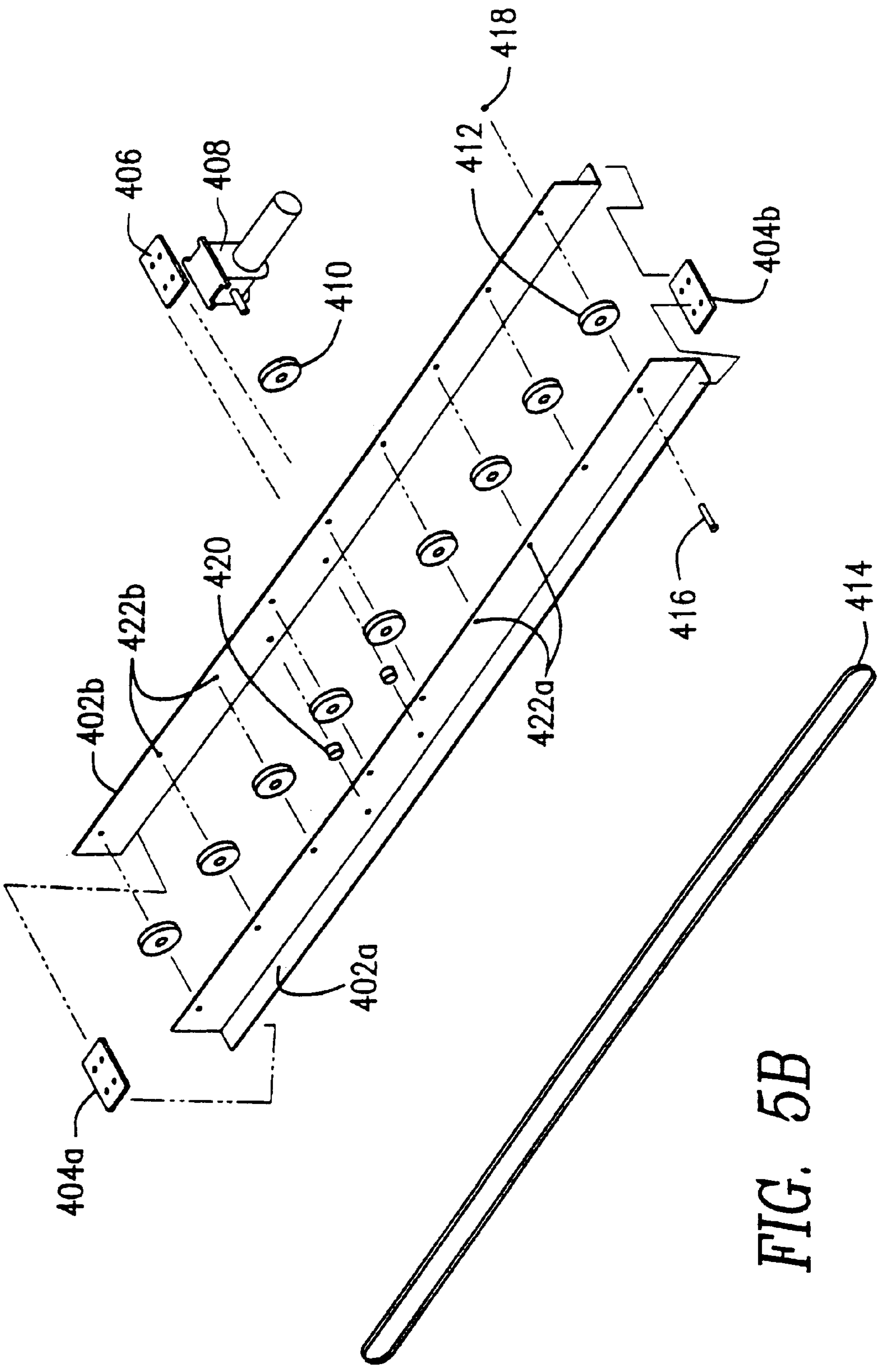
FIG. 5B is a front perspective view of the automated glass sealing apparatus of the present invention showing the glass advance assembly and its component parts in an assembled configuration.

The glass advance assembly 400, as shown in FIGS. 5A and 5B of the patent drawings, is used for moving the insulated glass assembly 16 from the input frame assembly 100 into the pinch rollers 204 of the pinch roller assembly 200. The glass advance assembly 400 includes a pair of roller mounting bars 402*a* and 402*b* attached to a pair of side mounting plates 404*a* and 404*b*, respectively. Roller mounting bars 402*a* and 402*b* include a plurality of mounting openings 422*a* and 422*b* therein, respectively, being evenly spaced apart within each of the bars 402*a* and 402*b*, respectively, as shown in FIGS. 5A and 5B of the drawings. The plurality of mounting openings 422*a* and 422*b* are opposite each other and receive therein a plurality of pulley mounting bolts and nuts 416 and 418 for holding a plurality of glass advance pulleys 412 therebetween, as shown in FIGS. 5A and 5B of the drawings. Roller mounting bar 402*b* includes an attached motor mounting plate 406 having a glass advance motor 408 with a motor sprocket 410 attached thereto. Glass advance assembly 400 further includes a glass advance pulley belt 414 being on the plurality of glass advance pulleys 412 having a pair of tension pulleys 420 thereon for putting additional tension on belt 414 when in the assembled state.

Output Frame Assembly 500

Figure 6A:
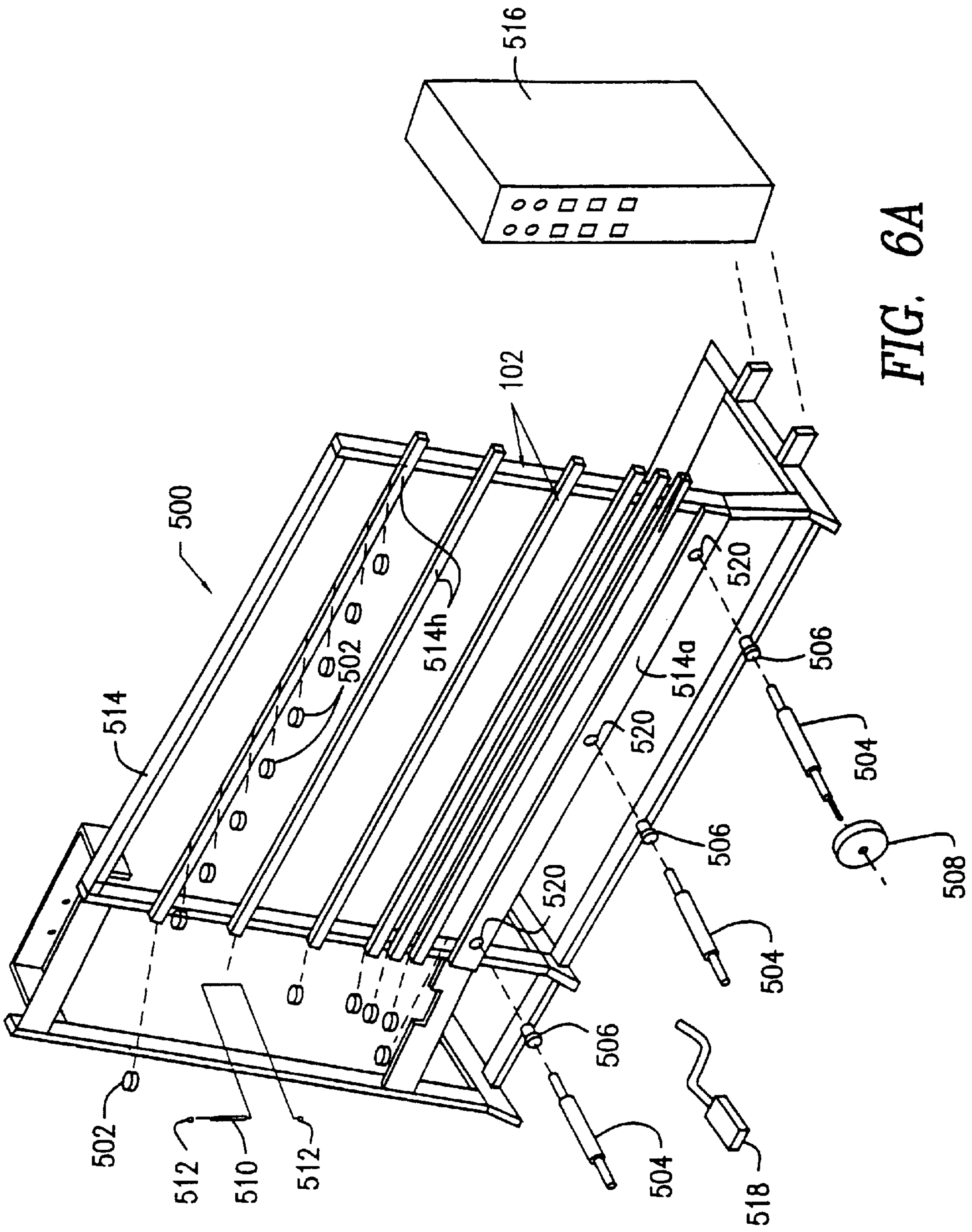
FIG. 6A is an exploded front perspective view of the automated glass sealing apparatus of the present invention showing the output frame assembly and its component parts being attached to the input frame assembly.
Figure 6B:
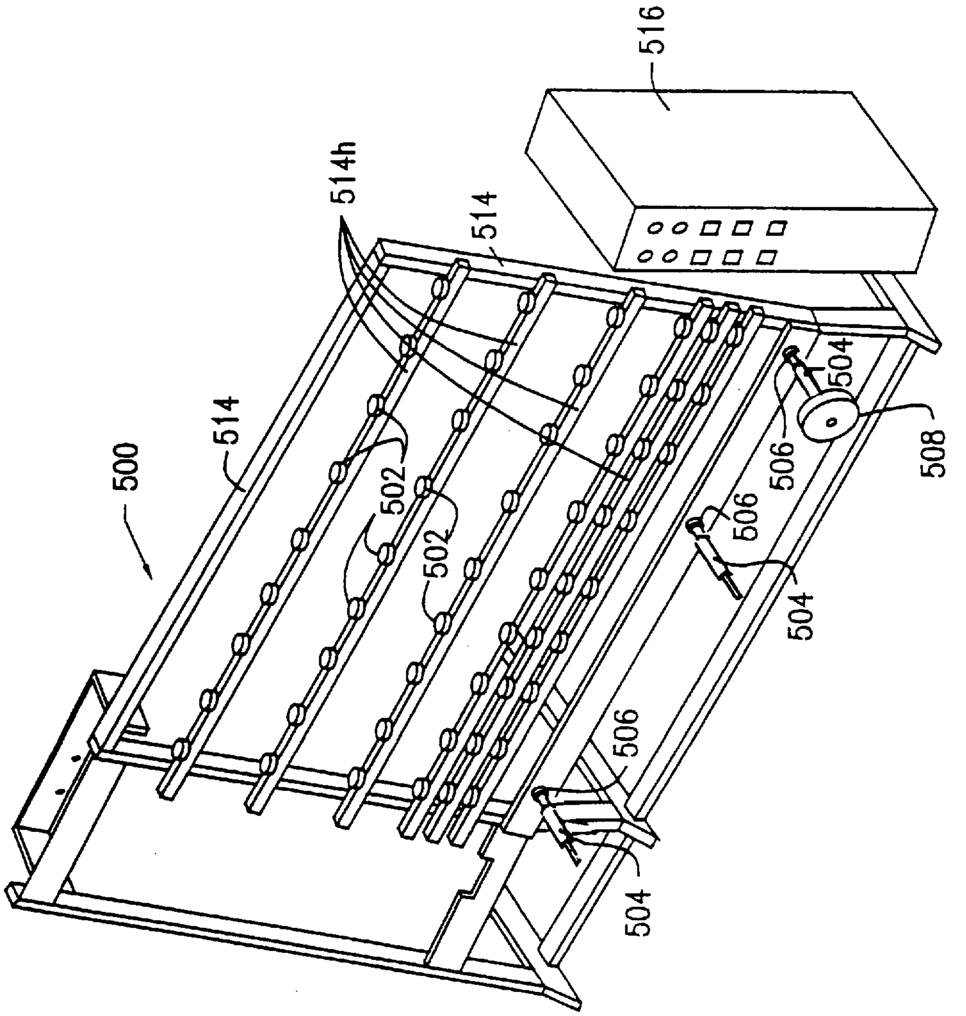
FIG. 6B is a front perspective view of the automated glass sealing apparatus of the present invention showing the output frame assembly and its component parts attached to the input frame assembly in an assembled configuration.

The output frame assembly 500, as depicted in FIGS. 6A and 6B of the patent drawings, is used for placing the sealed insulated glass assembly 14 in the post-sealing area 34 of the automated glass sealing apparatus 10. The output frame assembly 500 includes a substantially rectangular-shaped output frame 514 having a plurality of rollers 502 attached to the horizontal bars 514*h* of output frame 514. Rollers 502 are evenly spaced-apart along horizontal bars 514*h*. Each roller 502 is secured to horizontal bar 514*h* by a pair of roller axle rod retainer nuts 512 being attached to a roller axle rod 510, as depicted in FIG. 6A. The output frame assembly 500 further includes a plurality of ball screw members 504, a plurality of ball screw nuts 506 being attached to a plurality of mounting openings 520, respectively, within horizontal bar 514*a* of output frame 514. Additionally, sprocket 508 is attached to the shaft 505 of ball screw member 504 being located on the outer most ball screw member 504, as shown in FIGS. 6A and 6B of the drawings. Ball screw members 504 and sprocket 508 are used for setting the rollers 502 for an appropriate glass thickness, wherein the ball screw members 504 and sprocket 508 are able to be adjusted for varying the thickness of the glass panel assembly 14. The output frame assembly 500 also includes a cycle start switch 518 in the form of a foot pedal and a control panel 516. Control panel 516 houses all the electronic and electrical circuitry, relays, controllers, power supply solenoids, and sensors for the automated glass sealing apparatus 10 of the present invention.

Output Roller Assembly 600

Figure 7A:
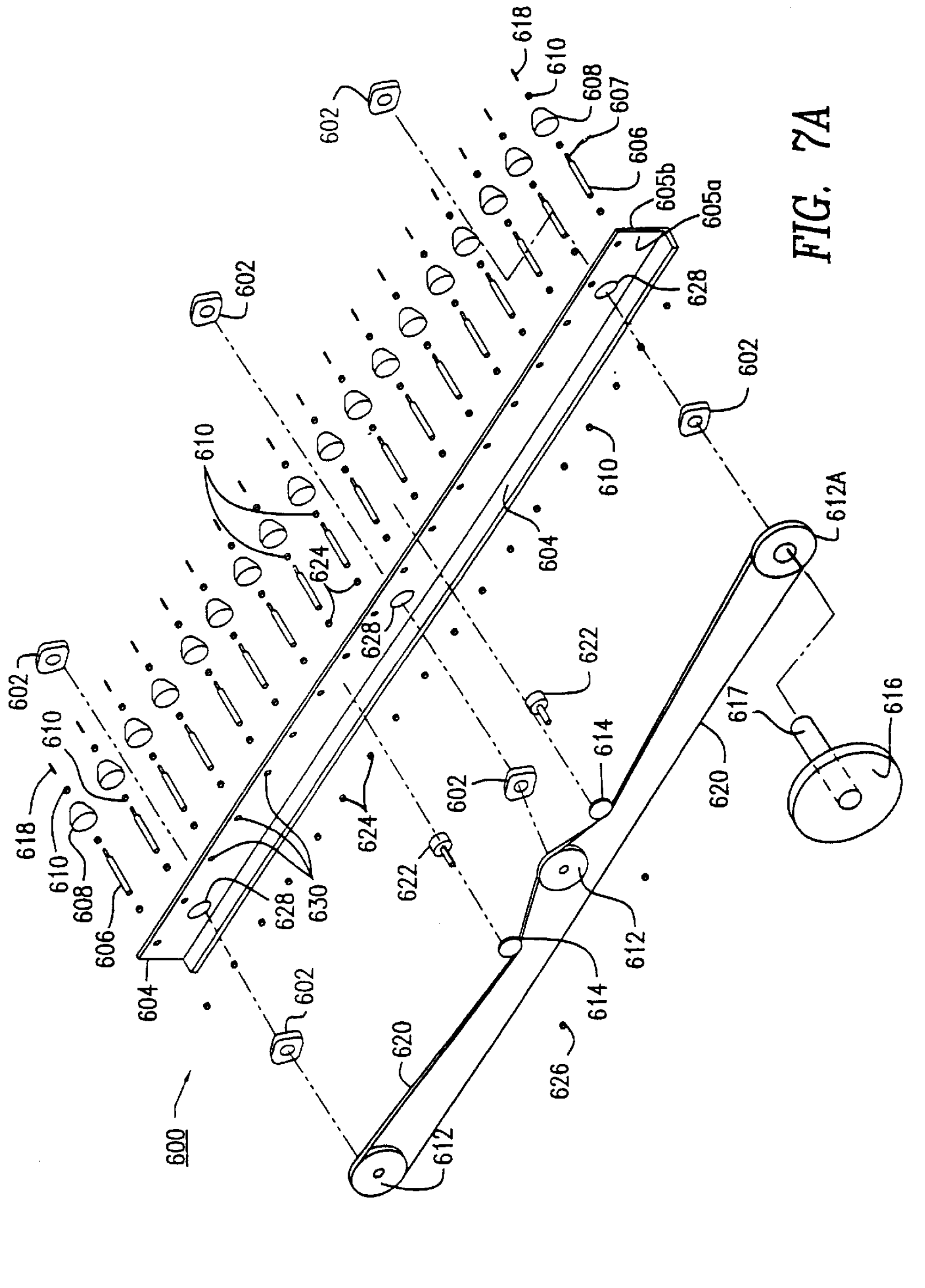
FIG. 7A is an exploded front perspective view of the automated glass sealing apparatus of the present invention showing the output roller assembly and its component parts contained therein.
Figure 7C:
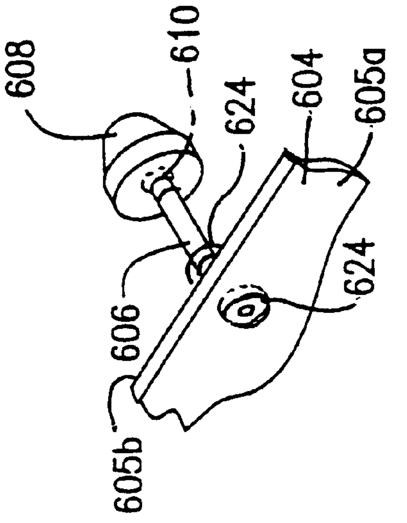
FIG. 7C is an enlarged top perspective view of the automated glass sealing apparatus of the present invention showing a single tapered roller attached to the roller holder angle member of the output roller assembly.
Figure 7B:
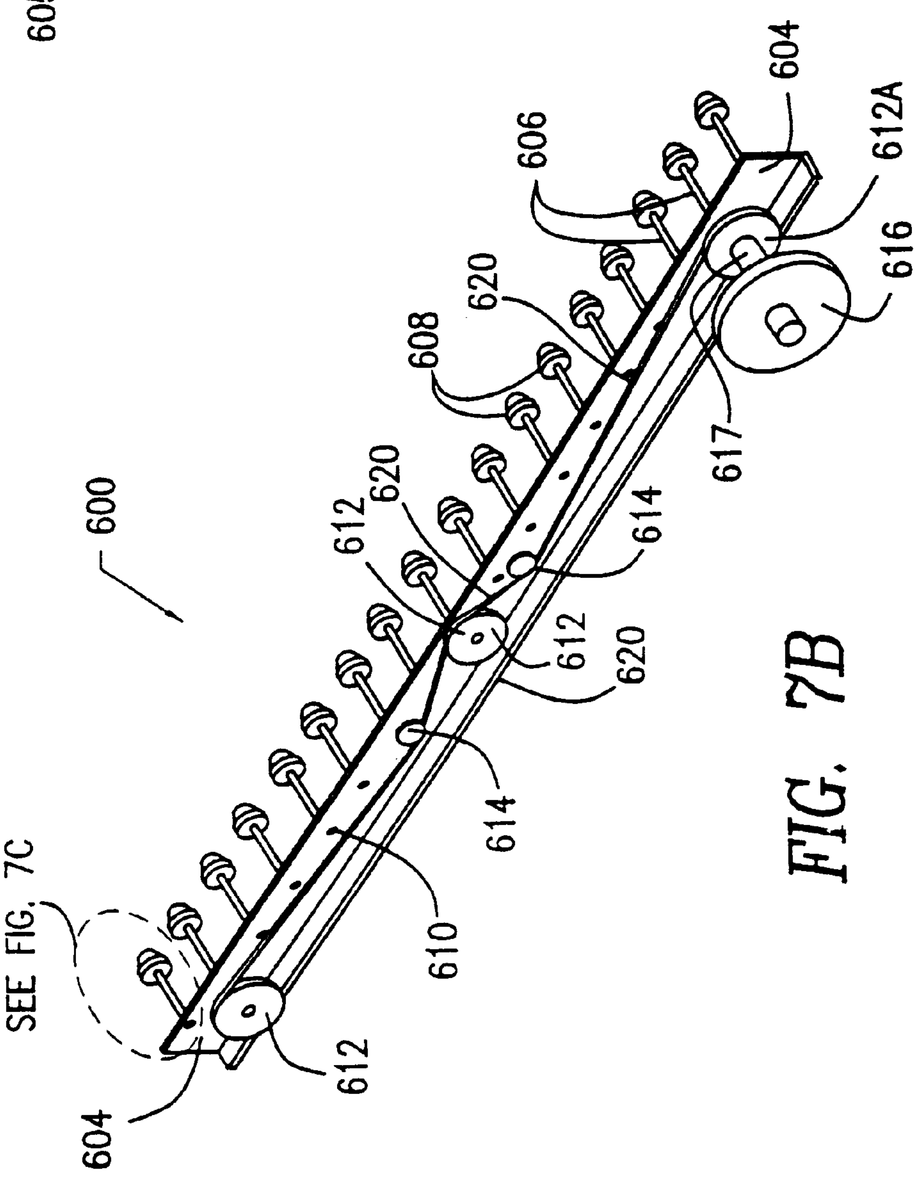
FIG. 7B is a front perspective view of the automated glass sealing apparatus of the present invention showing the output roller assembly and its component parts in an assembled configuration.

The output roller assembly 600, as shown in FIG. 7A and 7B of the patent drawings, is used to further move the sealed insulated glass assembly 14 from the connected output frame assembly 500 into the plurality of coned shaped (tapered) rollers 608, wherein only the outside of the insulated glass assembly 14 is in contact with the tapered rollers 608 to avoid depositing the sealant material 12 onto the tapered rollers 608. The output roller assembly 600 also has an adjustment feature being the hand wheel 616 to accommodate the thickness of various sizes of insulated glass assemblies 14. The output roller assembly 600 includes a plurality of bearing members 602 being connected to bearing openings 628, respectively, on each side 605*a* and 605*b* of the roller holder angle member 604. Roller holder angle member 604 includes a plurality of evenly spaced apart mounting openings 630 for receiving therein a plurality of roller axles 606, respectively. Each of the roller axles 606 is secured to the roller holder angle member 604 by a pair of roller axle nuts 624 on each side 605*a* and 605*b* of angle member 604, as depicted in FIG. 7A of the drawings. Additionally, each of the roller axles 606 includes a pair of roller bearings 610 being mounted on the shaft end 607 of roller axle 606 and having a tapered roller 608 also mounted on the shaft end 607 of roller axle 606. Tapered roller 608 is positioned between each of the roller bearings 610 on shaft end 607 of roller axle 606. Bearing 610 and tapered roller 608 are secured and held in place on roller axle 606 by a bearing retaining screw 618, as shown in FIGS. 7A and 7C of the patent drawings. The output roller assembly 600 further includes a plurality of members 612, a pair of tension sprocket members 614 each having a sprocket axle 622 attached thereto, with each sprocket axle 622 having a sprocket retaining collar 626 thereon, and a chain 620 attached to the plurality of sprocket pulley members 612 and 614, respectively as shown in FIGS. 7A and 7B of the patent drawings. Additionally, output roller assembly 600 includes a hand wheel member 616 having a wheel shaft 617 thereon. Shaft 617 of hand wheel member 616 is attached to the pulley sprocket member 612A, as shown in FIG. 7B of the patent drawings. Hand wheel member 616 is used for turning pulley sprocket member 612A which causes pulley sprocket members 612 and 612A to turn ball screw members 504. This aforementioned action of turning handle member 616 changes the distance between the output tapered rollers 608 and that of the output frame assembly 500, thereby allowing the tapered rollers 608 of the output assembly 600 to engage the glass panel assembly 14 on the outside edge of the glass panel assembly 16 eliminating any contact between the sealant material 12 and output tapered rollers 608 as the glass panel assembly 14 is moving forward (left to right), as shown in FIG. 1.

Electrical Control System 700

Figure 8:
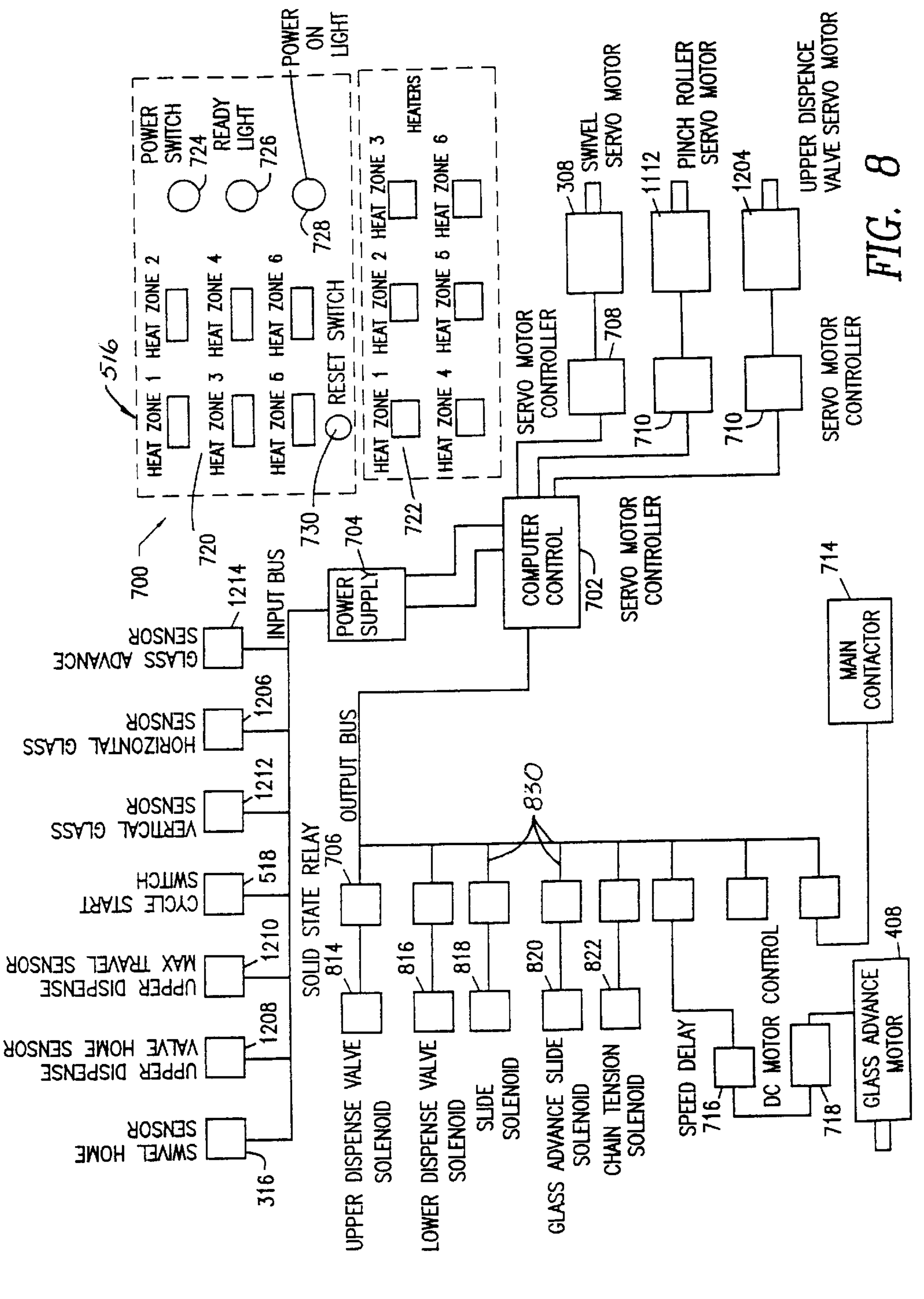
FIG. 8 is a schematic diagram of the automated glass sealing apparatus of the present invention showing the electronic control system and its component parts contained therein.

The electronic control system 700, as shown in FIG. 8 of the patent drawings, is used for electronically controlling the operation of the automated glass sealing apparatus 10. Electronic control system 700 provides the electronic controls for the aforementioned assemblies 100, 300, 400, 500, 600, 800, 900, 1100, 1200 and 1300. The electronic control system 700 includes a computer control module 702, a power supply 704, a solid state relay 706, a plurality of servo motor controllers 708, 710 and 712 for swivel servo motor 308, pinch roller servo motor 1112, and slide servo motor 1204, respectively. Electronic control system 700 further includes a main contactor 714, a DC motor speed delay module 716, a DC motor controller 718, an electronic control cabinet and panel 516. Control panel 516 includes a plurality of heat zone controller switches 720, a power switch 724, a ready light 726, a power "On" light 728 and a reset switch 730. Control panel 516 also has a plurality of heater switches 722 for various heat zones 1 through 6 within swivel assembly 1000, as shown in FIG. 8 of the drawings. All apparatus sensors 316, 518, 1206, 1208, 1210, 1212 and 1214 feed their appropriate electrical lines, as shown in FIG. 8, into the power supply 704 which is electrically connected to the PLC (programmable logic control) computer control module 702. The computer control module 702 provides the control aspect to the various aforementioned assemblies of apparatus 10. The power supply 704 is used for supplying the electrical power to the aforementioned controllers, switches and lights 720, 722, 724, 726, 728, and 730; as well as to the solid state relay 706, the main contactor 714, the DC motor speed relay and controller 716 and 718, and the glass advance motor 408. Power supply 704 is also used for supplying electrical power to solenoids 814 to 822, respectively. Solenoids 814 to 822 are electrically connected to the computer control module 702, as well as to the main contactor 714 via a plurality of electrical lines 830.

Electro-Pneumatic Control System 800

Figure 9:
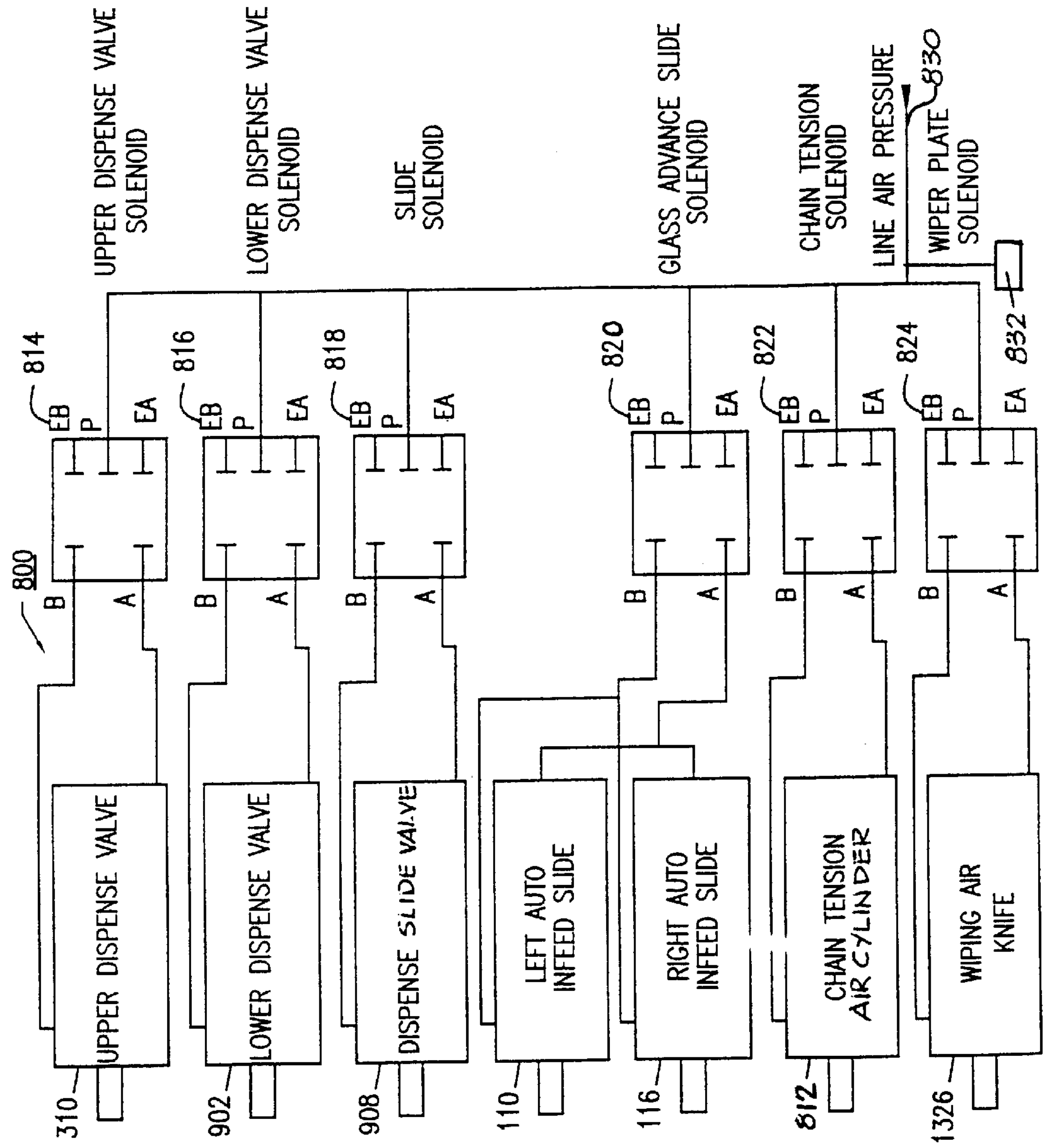
FIG. 9 is a schematic diagram of the automated glass sealing apparatus of the present invention showing the electro-pneumatic control system and its component parts contained therein.

The electro-pneumatic control system 800, as shown in FIG. 9 of the patent drawings, is used for the electro-pneumatic control of the plurality of the solenoids 814, 816, 818, 820, 822 and 824 and the chain tensioner air cylinder 816. The electro-pneumatic control system 800 provides the pressurized pneumatic air 830 from the compressed air supply (compressor) 1322 in which to power the individual valves 310, 902 and 908; slides 110 and 116, a chain tension air cylinder 812 and a wiping air knife 1326. The electro-pneumatic control system 800 includes a plurality of pressurized air lines P, A and B having pressurized air 830 therein, at a regulated pressure of 80 psig via an air regulator 832, and a plurality of solenoids for activating various component parts within each of the major assemblies 100, 300, 800, 900.and 1300, respectively. These solenoids include, as shown in FIG. 9, an upper dispense valve solenoid 814, a lower dispense valve solenoid 816, a slide solenoid 818, a glass advance slide solenoid 820, a chain tension solenoid 822 and a wiper plate solenoid 824.

Solenoids 814 and 824 are connected in parallel with air lines A and B via the air regulator 832 having at least 80 psig air 830 passing through air regulator 832, as depicted in FIG. 9 of the drawings. Upper dispense valve solenoid 814 is connected to the upper dispense valve 310 via air lines A and B. Lower dispense valve solenoid 816 is connected to the lower dispense valve 902 via air lines A and B. Slide solenoid 818 is connected to dispense slide valve 908 via air lines A and B. Glass advance slide solenoid 820 is connected to both of the left and right auto infeed slides 110 and 116, respectively, via air lines A and B. Chain tension solenoid 822 is connected to the chain tension air cylinder 812 via air lines A and B. Wiper plate solenoid 824 is connected to the wiping air knife 1326 via air lines A and B.

Lower Dispensing Head Assembly 900

Figure 10B:
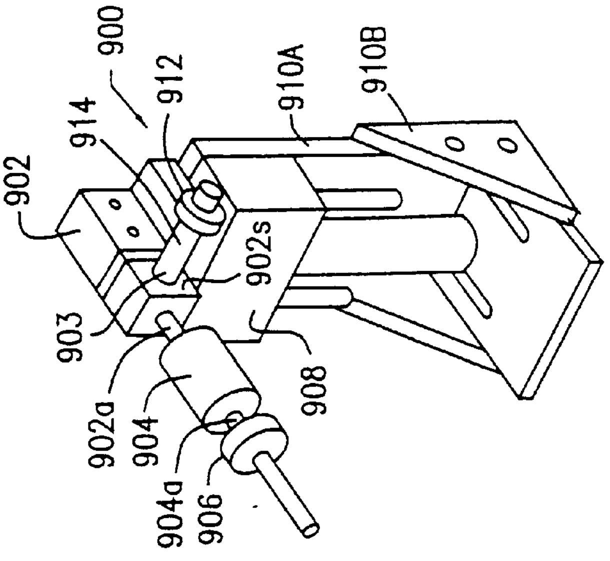
FIG. 10B is a front perspective view of the automated glass sealing apparatus of the present invention showing the lower dispensing head assembly and its component parts in an assembled configuration.
Figure 10A:
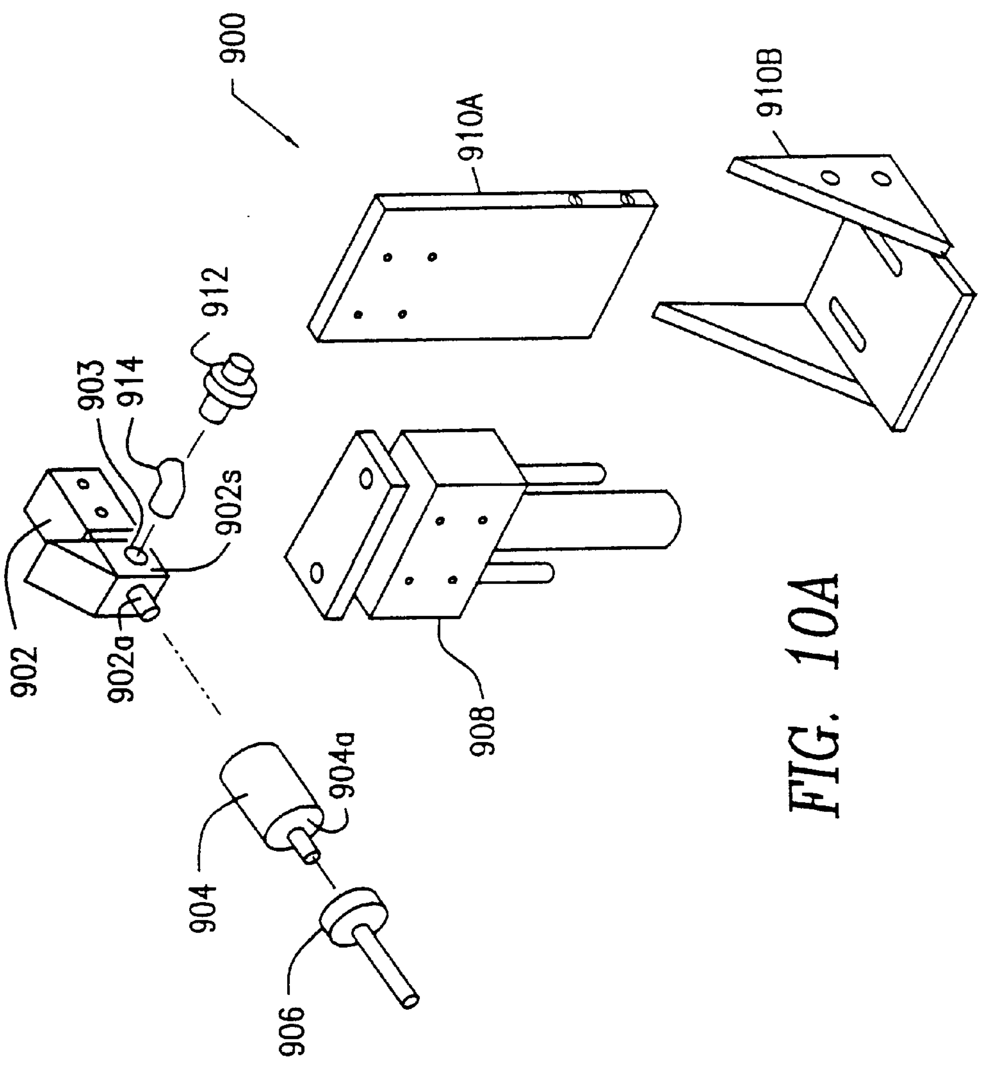
FIG. 10A is an exploded front perspective view of the automated glass sealing apparatus of the present invention showing the lower dispensing head assembly and its component parts contained therein;.

The lower dispensing head assembly 900, as depicted in FIGS. 10A and 10B of the patent drawings, is used for depositing and applying a sealant material 12 on the bottom side within the air space 26 of the insulated glass panel assembly 14 consisting of two panes of glass 16 and 18 separated by a spacer frame 20. The lower dispensing head assembly 900 includes a dispensing head 902, a dispensing head extension tube 904, a dispensing nozzle 906, a hose adapter 912, and an adapter elbow 914. The dispensing nozzle 906 is connected to the front end 904*a* of dispensing head extension tube 904 wherein dispensing nozzle 906 and extension tube 904 are then connected to the front end nozzle 902*a* of dispensing head 902, as depicted in FIGS. 10A and 10B of the drawings. Hose adapter 912 is connected with the adapter elbow 914, such that adapter elbow 914 is connected to a receiving opening 903 being located on side wall 902*s* of dispensing head 902. Lower dispensing head assembly 900 further includes a pneumatic slide 908 being attached to the mounting brackets 910A and 910B, respectively, as shown in FIGS. 10A and 10B of the drawings.

Swivel Assembly 1000

Figure 11A:
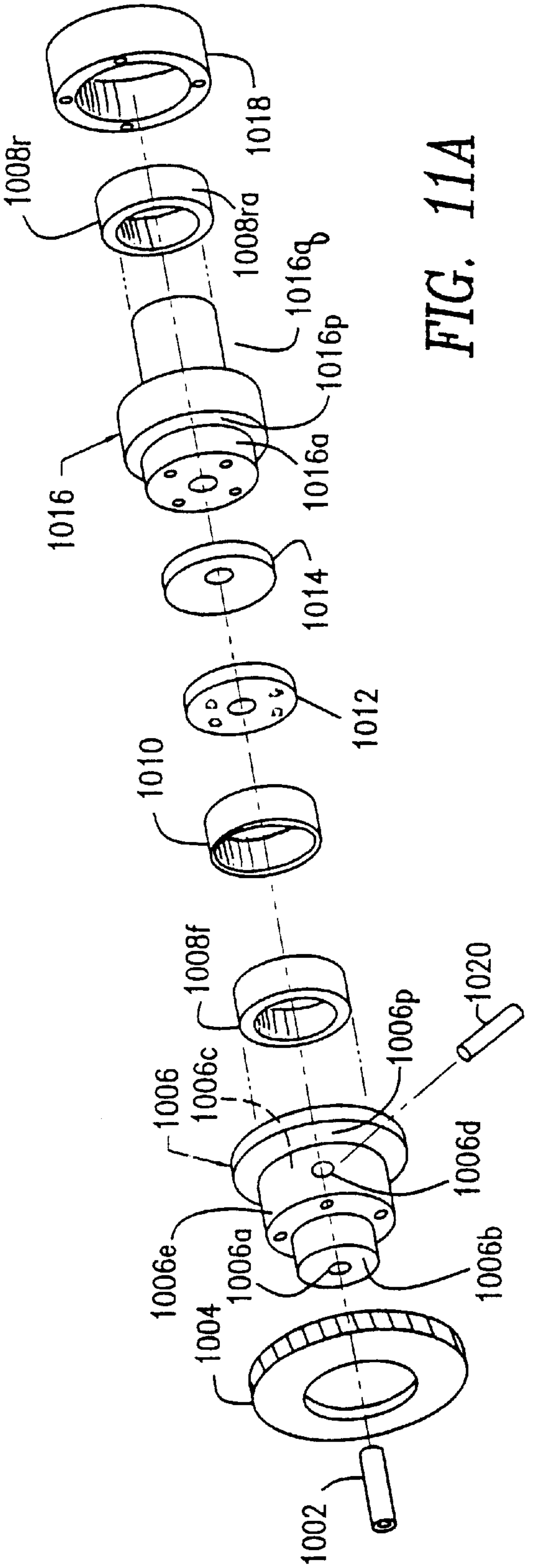
FIG. 11A is an exploded front perspective view of the automated glass sealing apparatus of the present invention showing the swivel assembly and its component parts contained therein.
Figure 11B:
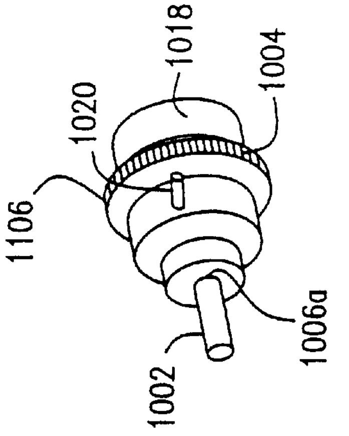
FIG. 11B is a front perspective view of the automated glass sealing apparatus of the present invention showing the swivel assembly and its component parts in an assembled configuration.

The swivel assembly 1000, as depicted in FIGS. 11A and 11B of the patent drawings, is used for the cornering of the upper nozzle 318 of the upper dispensing head assembly 300 along and around the corners of the insulated glass assembly 14 (allowing the upper nozzle 318 to turn around the corners of the glass panel assembly 14). The swivel assembly 1000 is connected to the upper dispensing head assembly 300, as shown in FIG. 4B of the drawings. Swivel assembly 1000 includes a nozzle tube 1002, a gear member 1004, a front swivel hub 1006, a front swivel bearing 1008*f,* a spacer 1010, a seal retainer plate 1012 and a swivel seal 1014. Nozzle tube 1002 is connected to nozzle mounting opening 1006*a* on the front wall surface 1006*b* of front swivel hub 1006. Front swivel bearing 1008*f* is received within hub chamber opening 1006*c* of front swivel hub 1006 and swivel bearing 1008*f* is held in place via set screw 1020 through screw opening 1006*d* located on hub outer wall surface 1006*e* of front swivel hub 1006, as depicted in FIG. 11A of the drawings. Gear member 1004 seats on hub outer wall surface 1006*e* and is adjacent and in contact with hub perimeter wall surface 1006*p* of front swivel hub 1006. The swivel assembly 1000 further includes a center swivel hub 1016, a rear swivel bearing 1008*r* and a rear swivel hub 1018. Spacer 1010 surrounds both the seal retainer plate 1012 and the swivel seal 1014. Spacer 1010 then seats on the hub first outer wall surface 1016*a* and is adjacent and in contact with hub perimeter wall surface 1016*p* of center swivel hub 1016. Rear swivel bearing 1008*r* mounted on the hub third outer wall surface 1016g of center swivel hub 1016 and rear swivel hub 1018 is mounted to the outer wall surface 1008*ra* of rear swivel bearing 1008*r;* as depicted in FIGS. 11A and 11B of the drawings.

Pinch Roller Drive Assembly 1100

Figure 12A:
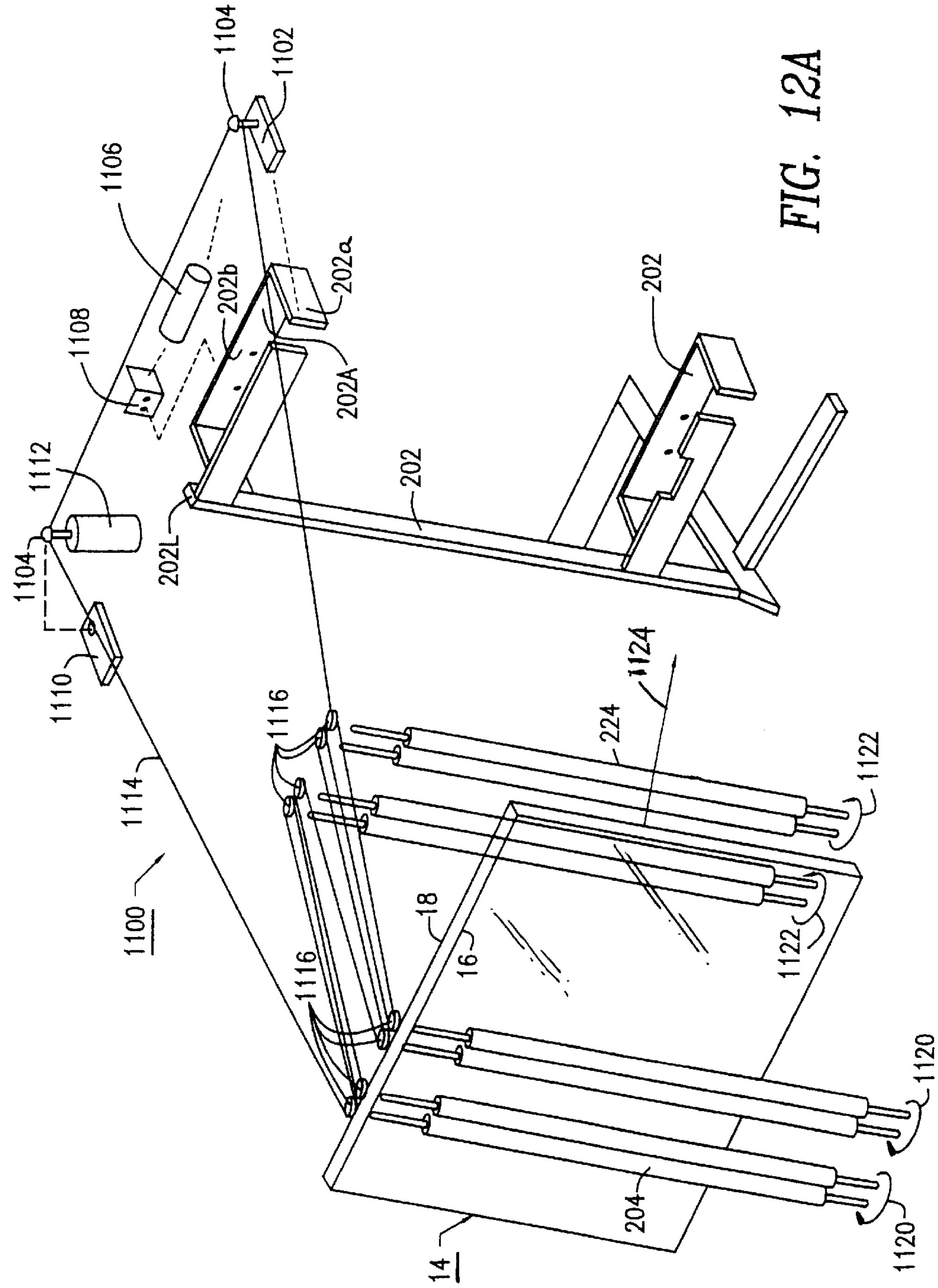
FIG. 12A is an exploded front perspective view of the automated glass sealing apparatus of the present invention showing the pinch roller drive assembly and its component parts contained thereon.
Figure 12B:
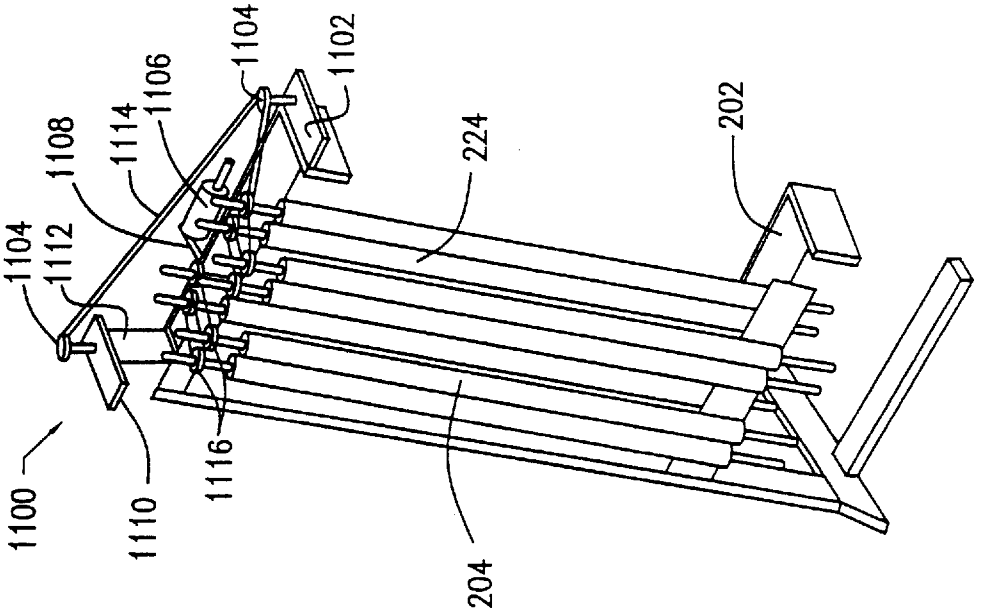
FIG. 12B is a front perspective view of the automated glass sealing apparatus of the present invention showing the pinch roller drive assembly and its component parts in an assembled configuration.

The pinch roller drive assembly 1100, as shown in FIGS. 12A and 12B, is the mechanism to drive the plurality of forward and rear pinch rollers 204 and 224 in a rotational movement, such that the forward pinch rollers 204 move in a clockwise motion 1120 and the rear pinch rollers 224 move in a counter-clockwise motion 1122, respectively. This rotational movement of the pinch roller drive assembly 1100 moves the glass panel assembly 14 in a horizontal direction 1124, as depicted in FIG. 12A of the drawings. The pinch roller drive assembly 1100 includes a tension arm member 1102, a tension arm sprocket 1104, a chain tension air cylinder 1106 and an air cylinder mounting bracket 1108. Tension arm sprocket 1104 is mounted to the tension arm 1102 and the chain tension air cylinder is mounted to air cylinder mounting bracket 1108 for tensioning chain/pinch roller drive chain 1114 when in the assembled state, as depicted in FIG. 12A and 12B of the drawings. Tension arm 1102 is mounted on side wall surface 202*a* of upper frame 202A and mounting bracket 1108 is connected to rear wall surface 202*b* of upper frame 202A, respectively. The pinch roller drive assembly 1100 further includes a pinch roller motor mounting bracket 1110, a pinch roller servomotor 1112 and a plurality of pinch roller sprockets 1116 for holding thereon pinch roller drive chain 1114, as shown in FIG. 12B of the drawings. Pinch roller servomotor 1112 is mounted on the pinch roller motor mounting bracket 1110 and mounting bracket 1110 is mounted to an L-shaped frame member 202L, as shown in FIGS. 12A and 12B of the drawings. Additionally, drive chain 1114 is connected to the plurality of pinch roller sprockets 1116 to produce the rotation movement 1120 and 1122 required to move glass panel assembly 14 forward in a horizontal direction 1124, as shown in FIGS. 12A of the drawings.

Upper Dispense Head Slide Assembly 1200

Figure 15:
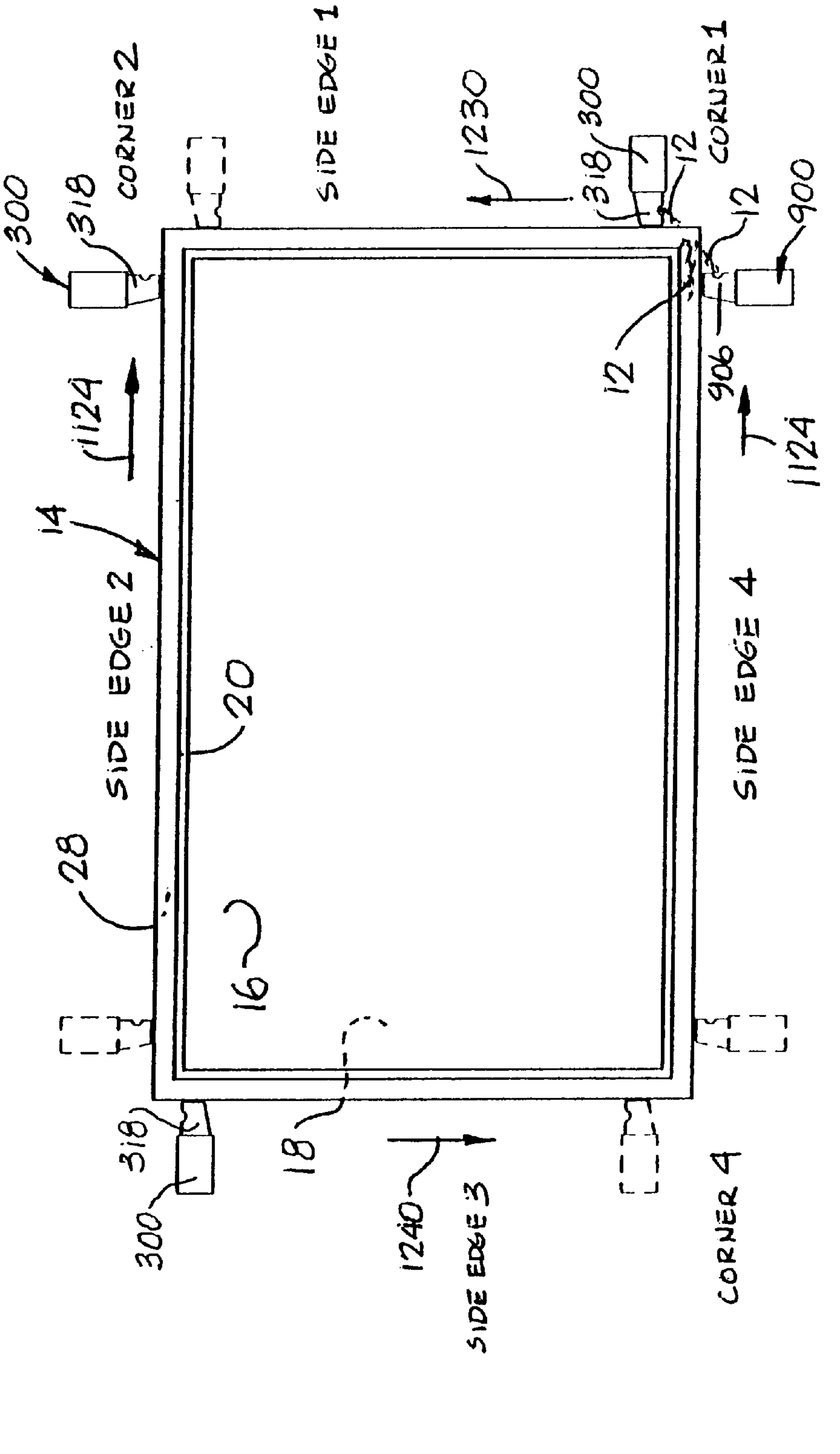
FIG. 15 is a schematic diagram of the automated glass sealing apparatus of the present invention showing the upper and lower dispensing head assemblies in operational use for extruding sealant material to an insulated glass assembly.

The upper dispense head slide assembly 1200, as depicted in FIGS. 13A, 13B and 15 of the-patent drawings, is used to move the upper dispensing head assembly 300 in a vertical direction 1220 as the nozzle 318 dispenses sealant material 12 on the vertical sides of glass panel assembly 14. The upper dispense head slide assembly 1200 includes an upper head slide sub-assembly 1202, an upper dispensing valve servomotor 1204, a horizontal glass panel assembly sensor 1206, an upper dispensing valve home sensor 1208, an upper dispensing valve maximum sensor 1210, a vertical glass panel assembly sensor 1212 and a glass panel assembly advance sensor 1214. The upper head slide sub-assembly 1202 includes a slide carriage 1216, a plurality of pulleys 1218 and a drive belt 1220, as shown in FIG. 13A of the drawings. Upper head slide sub-assembly 1202 is connected to pinch roller frame 202 and the upper dispensing head assembly 300 is attached to the movable slide carriage 1216 of slide sub-assembly 1202.

The horizontal glass sensor 1206 is attached to mounting plate 302*d*. Horizontal glass sensor 1206 senses the glass panel assembly 14 and positions the leading edge of the glass panel assembly 14 to be sealed on sides 1 and 3, as depicted in FIG. 15 of the drawings. Additionally, the horizontal glass sensor 1206 also senses the trailing edge of glass panel assembly 14 that has been sealed. The upper dispensing valve home sensor 1208 is mounted at the lower end of the upper head slide sub-assembly 1202, as shown in FIG. 13A of the drawings. Home sensor 1208 is used for sensing that dispensing head assembly 300 is in the home or start position. The upper dispensing valve maximum sensor 1210 is mounted at upper end of the upper head slide sub-assembly 1202. Maximum sensor 1210 is used for sensing when the dispensing head assembly 300 travels upwardly and passes the maximum sensor 1210 which then shuts down apparatus 10. The vertical glass sensor 1212 is mounted on frame 202D. Vertical glass sensor 1212 is used for sensing the dispensing head assembly 300 is in position on side 2 of the glass panel assembly 14, as shown in FIG. 15 of the drawings. The glass advance sensor 1214 is mounted on the outside edge of frame 202D, as shown in FIGS. 13A and 13B of the drawings. Glass advance sensor 1214 is used for sensing when the glass panel assembly 14 passes sensor 1214 which then starts motor 1112 rotating such that rollers 204 and 224 advance the glass panel assembly 14 through the sealing operation.

Wiper Plate Assembly 1300

Figure 14A:
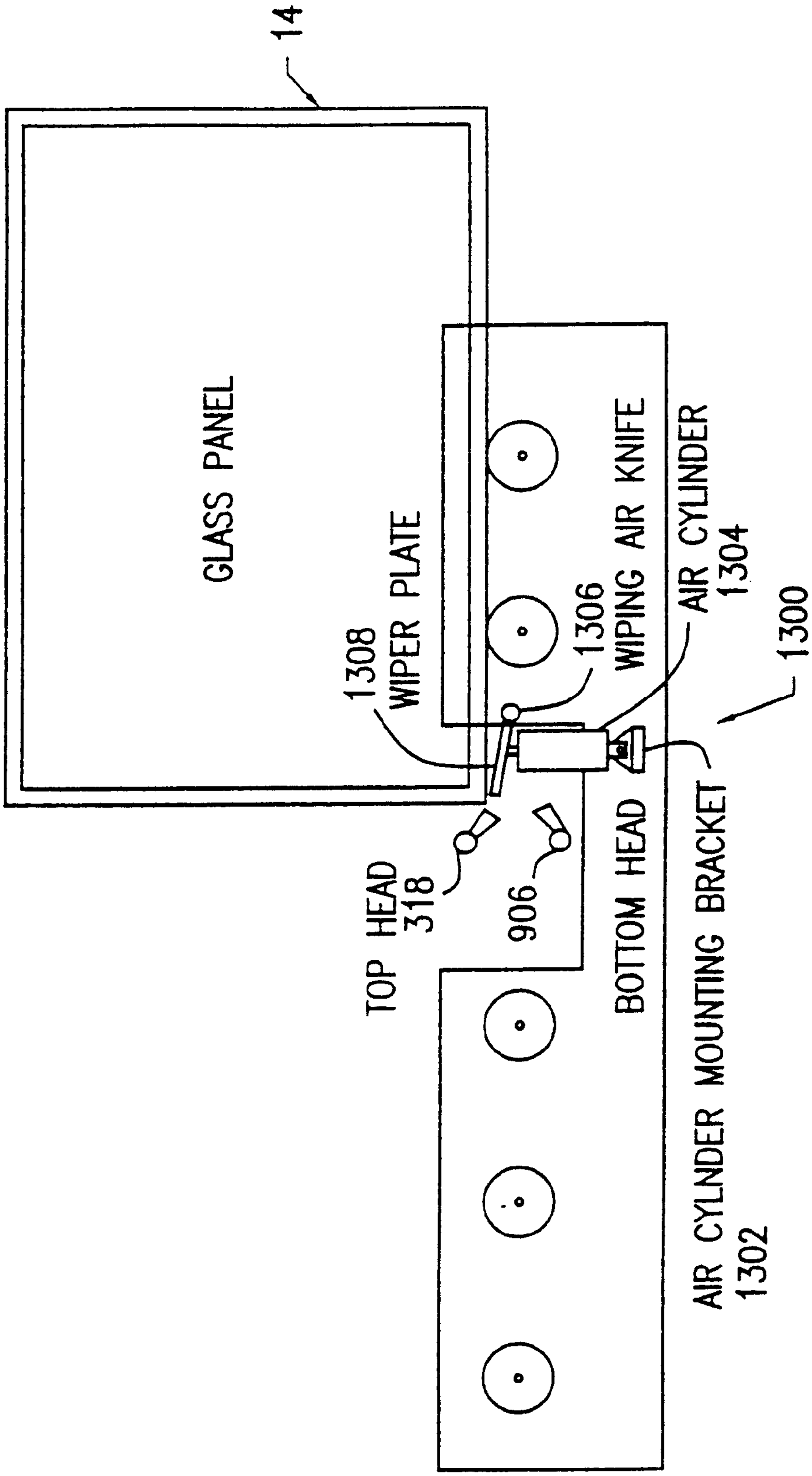
FIG. 14A is a schematic diagram of the automated glass sealing apparatus of the present invention showing the preferred wiper plate assembly and its component parts contained therein.
Figure 14B:
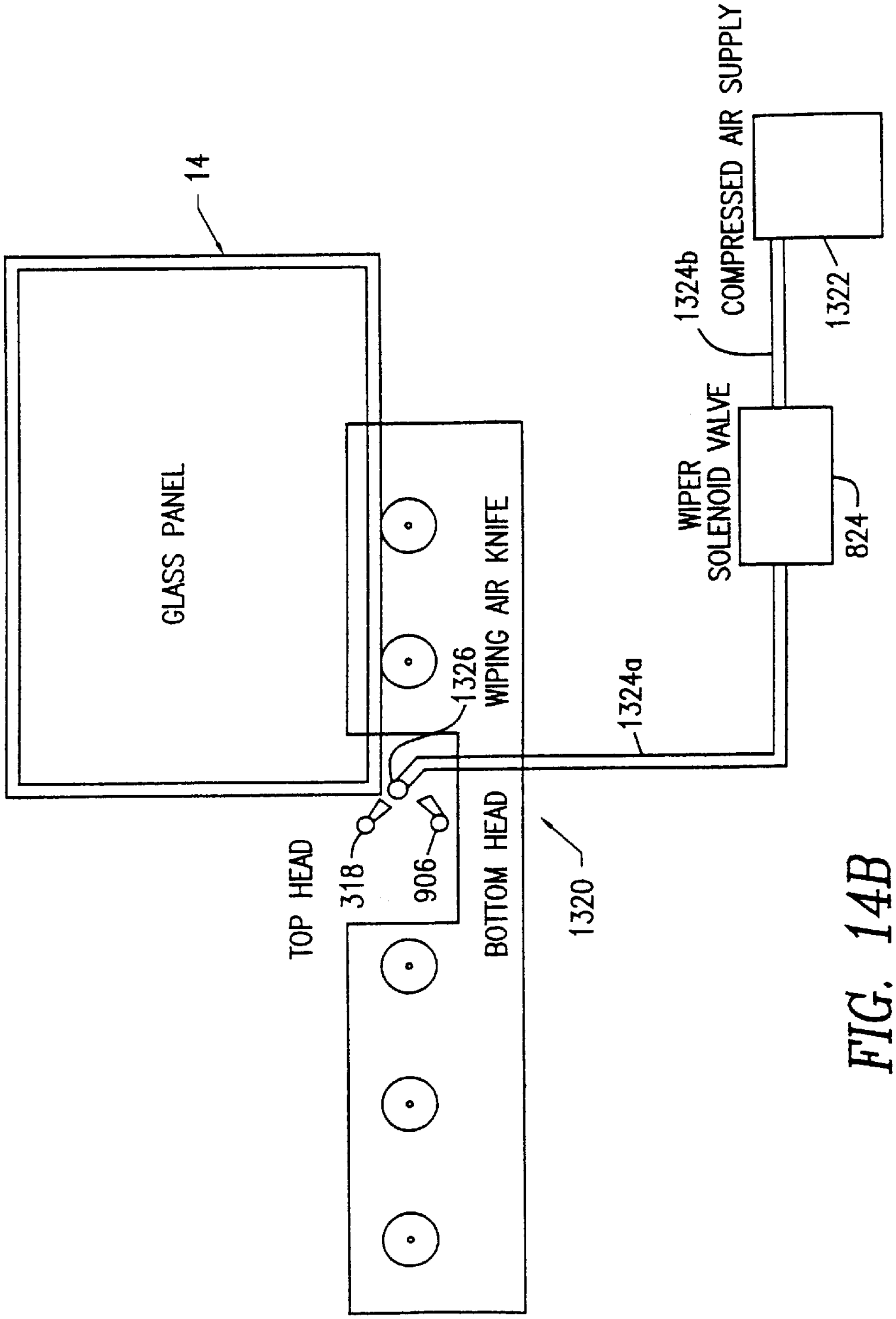
FIG. 14B is a schematic diagram of the automated glass sealing apparatus of the present invention showing an alternate wiper plate assembly and its component parts in an assembled configuration.

The wiper plate assembly 1300, and an alternate wiper plate assembly 1320 are depicted in FIGS. 14A and 14B of the patent drawings. The wiper plate assemblies 1300 and 1320 are used to wipe off any excess sealant material 12 from the final corner of the glass panel assembly 14 and to remove any excess sealant materials 12 from the upper and lower dispensing nozzles 318 and 906 of the upper and lower dispensing head assemblies 300 and 900, respectively. Wiper plate assembly 1300 includes an air cylinder mounting bracket 1302, an air cylinder member 1304, a wiping air knife 1306 and a wiper plate 1308. Air cylinder member 1304 is connected at one end to the air cylinder mounting bracket 1302 and at the other end to the wiping air knife 1306 and wiper plate 1308, as shown in FIG. 14A. The alternate wiper plate assembly 1320 includes a compressed air supply 1322 connected to the wiper solenoid valve 824 via air line 1324, and wiper solenoid valve 824 is connected to wiping air knife 326 via air line 1324*b*. Alternate embodiment of wiper plate assembly 1320 functions in the same manner as the wiper plate assembly 1300 for the removing of excess sealant material 12 at the final corner. Operation of the Present Invention Setup In operation, the automatic glass sealing apparatus 10, as shown in FIG. 1 of the drawings, the initial setup step includes attaching hose 40 from apparatus 10 to pump 42 having a pressure regulator 44 thereon. Hose 40 also includes a quick disconnect fitting 46 for detachably releasing hose 40 from pump 42. Pump 42 is connected to an insert pipe 48, such that insert pipe 48 is inserted within a 55 gal drum 50 having sealant material 12 therein for pumping of the sealant material 12 to the upper and lower dispensing head assemblies 300 and 900, respectively. Power switch 724 is then turned on to start the operation of apparatus 10, where then heat controllers 720 will be initialized and turned on also. After initialization of heat controllers 720, reset switch 730 is then depressed, which then engages the main contactor 714 for supplying electrical power to the automatic glass sealing apparatus 10, as shown in FIG. 8 of the drawings.

Initialization

When using the heated system 720, the computer control module 702 is supplied with electrical power from power supply 704, such that the heated system 720 will remain in a wait state until the heaters 722 in swivel assembly 1000 heat the swivel assembly 1000 to approximately 300° F. At that point in time, the upper dispense head slide assembly 1200 and swivel assembly 1000 will initialize to their start positions. The upper dispensing head assembly 300 is connected to the upper head slide sub-assembly 1202, and swivel assembly 1000 is connected to the upper dispensing head assembly 300. On initialization, slide sub-assembly 1202 will be moved by the upper dispensing valve servomotor 1204. Slide sub-assembly 1202 will then turn pulleys 1218 which will in turn move drive belt 1220. Drive belt 1220 is connected to slide carriage 1216; and drive belt 1220 will move slide carriage 1216 and the upper dispensing head assembly 300 in the up/vertical direction 1230 to a preset clearance height in order to allow swivel assembly 1000 to turn freely without obstruction. When upper dispense head assembly 300 has reached this position, servomotor 308 turns the servomotor gear 304 and the middle gear 306, respectively, which allows swivel assembly 1000 to rotate until swivel home sensor 316 has detected its home position. Then at this point, nozzle 318 being connected to the swivel head assembly 1000 is then oriented to seal the glass panel assembly 14 with sealant material 12. Upper dispensing valve servomotor 1204 is connected to slide sub-assembly 1202 which will in turn rotate pulleys 1218 to move drive belt 1220. Drive belt 1220 will then move slide carriage 1216 and the upper dispensing head assembly 300 in the down/vertical direction 1240 until the home sensor 1208 has detected the upper dispensing head assembly 300.

Cycle Operation

When foot pedal switch 518 is depressed downwardly, pinch roller servomotor 1112 will activate and will turn drive chain 1114 around pulleys 1116 where in turn rollers 204 and 224 will start to rotate. Glass panel assembly 14 is then placed on the plurality of input rollers 112 which are in contact with rollers 104 thereto, where then glass panel assembly 14 is then manually pushed from left to right and in-between rollers 204 and 224, as depicted in FIGS. 12A and 12B of the drawings. Rollers 204 and 224 then engage the glass panel assembly 14 and move panel assembly 14 to the right, where then panel assembly 14 passes the horizontal glass assembly position sensor 1212. When horizontal glass position sensor 1212 detects the glass panel assembly 14, the sensor 1212 then allows the rollers 204 and 224 to advance the glass panel assembly 14 a predetermined distance to the right in order to engage the glass panel assembly 14 into nozzle 318 of the upper dispensing head assembly 300.

Computer control module 702 will enable solid state relay 706 to turn on the upper dispense valve solenoid 814 where in turn then opens valve 310. At this point, valve 310 is opened, which allows sealant material 12 to flow into swivel assembly 1000 and through nozzle 318, and into the sealant space 28 between glass panels 16 and 18 of the glass panel assembly 14. Simultaneously, servomotor 1204, will then move the upper dispensing head assembly 300 in the up (vertical) direction 1230 and will deposit sealant material 12 from bottom to top along the right side of the glass panel assembly 14. The upper dispensing head assembly 300 will continue to move in the up (vertical) direction 1230 until the vertical glass positioning sensor 1206 detects the upper edge of the glass panel assembly 14. At this point, the upper dispensing head assembly 300 will move an additional preset distance and position nozzle 318 in the upper right corner of the glass panel assembly 14. Computer control 702 will disable solid state relay 706 and turn off upper dispense valve solenoid 814, which will then close valve 310. This causes the flow of sealant material 12 to cease through swivel assembly 1000 and nozzle 318. At this point, computer control module 702 will turn on the solid state relay 706 and turn on slide. solenoid 818, where then slide 908 moves and engage nozzle 906 into the bottom of the sealant space 28 which allows sealant material 12 between glass panels 16 and 18 of the glass panel assembly 14. At this point, servomotor 308, will turn gears 304 and 306 simultaneously, which then turns swivel assembly 100 to rotate nozzle 318 until it has rotated 90° degrees counterclockwise. Simultaneously, pinch roller servomotor 1112 turns drive chain 1114 which is connected to the pinch roller sprocket gears 1116 and turns rollers 204 and 224 which will move the glass panel assembly 14 to the right. This causes the nozzle 318 to rotate around the upper right corner of the glass panel assembly 14, as shown in FIG. 15 which maintaining its engaged position within the edge of the glass panel assembly 14. The combined movement of the rollers 204 and 224, which moves the glass panel assembly 14, and with the 90° degree movement of the nozzle 318, act together to cause the nozzle to circumscribe an arc of 90° degrees around the corner of the glass panel assembly 14.

Servomotor 1112 continues to turn drive chain 1114 which is connected to sprocket gears 1116 and turns roller 204 and 204 which will then move glass panel assembly 14 in a horizontal direction along side 2, as shown in FIG. 15. Simultaneously, valve 310 and 902 are turned on, allowing sealant material 12 to flow through swivel assembly 1000 and nozzle 318, as well as extension tube 904 and nozzle 906, of the upper and lower dispensing head assemblies 300 and 900, respectively. Valves 310 and 902 are turned on by computer control module 702 which turns on their solid state relays 706 which engages solenoids 914 and 816. Glass panel assembly 14 moves in a horizontal direction to the right until it has passed the horizontal glass sensor 1206. As soon as the trailing edge of the glass panel assembly 14 passes the horizontal glass sensor 1206, the glass panel assembly 14 will then move a preset distance to position nozzle 318 and nozzle 906 to the upper left and lower left corners, respectively. Servomotor 1112 will then stop, and simultaneously valves 902 and 310 are shut off to cease flow of sealant material 12 into glass panel assembly 14. Valves 310 and 902 are turned off by computer control 702 which turns off their solid state relays 706 which disengages solenoids 914 and 816. Computer control 702 turns off solid state relay 706 which turns off slide solenoid 818 which then retracts slide 908 and disengages nozzle 906 from glass panel 14.

At this point, servomotor 308 then turns gears 304 and 306 thereby turning swivel assembly 1000, which rotates nozzle 318 until it has rotated 90° degrees counterclockwise. Simultaneously, servomotor 1112 turns chain 1114 which is connected to gears 1116 and turns roller 204 and 224 which will move the glass panel assembly 14 to the right. This causes the nozzle 318 to rotate around the upper left corner of the glass panel 14, which maintains its engaged position within the edge of the glass panel assembly 14. The combined rotational movement of the rollers 204 and 224 to move the glass panel assembly 14 into a 90° degree movement of the rollers 204 and 224 and nozzle 318 in acting together causing the nozzle 318 to circumscribe in an arc of 90° degrees around the corner of the glass panel assembly 14.

Valve 310 turns on (as described earlier) and sealant material 12 flows through nozzle 318 while simultaneously servomotor 1204 moves the upper dispensing head assembly 300 in the down (vertical) direction 1240, depositing sealant material 12 along the trailing edge of the glass panel assembly 14 until home sensor 1208 is reached. At this point, valve 310 will turn off, ceasing flow of sealant material 12 through nozzle 318. Simultaneously, servomotor 1204 moves upper dispensing head assembly 300 in the up (vertical) direction 1230 and where then servomotor 1112 turns chain 1114 which is connected to gears 1116 and turns roller 204 and 224, thus moving glass panel assembly 14 in the direction away from the dispensing nozzle 318. This action causes the sealant material 12 to break away from the nozzle 318, and prevents the sealant material 12 from being pulled out of the final corners and wipe plate 1308 wipes the nozzle 318 clean of excess sealant material 12. Servomotor 308, turns gears 304 and gear 306 which will then turn swivel assembly 1000 thereby rotating nozzle 318 until the swivel home sensor 316 is reached.

At this point, wipe plate 1308 is moved vertically along a predetermined distance, by means of a computer control module 702 thereby powers on the solid state relay 706 which turns on wipe plate solenoid 824 and enables wipe plate air cylinder 1304 to action. At this point, servomotor 1112, then turns rollers 204 and 224 to engage and to move the glass panel assembly 14 back (to the left) towards the wipe plate 1308. When the glass panel assembly 14 reaches the wipe plate 1308, the dispensing head assembly 900 packs the sealant material 12 into the final corner, and breaks material from nozzle 906. Then, the servomotor 1112 reverses direction, moving rollers 204 and 224 to expel the sealed glass panel assembly 14 out of rollers 204 and 224 and onto rollers 608. The cycle is complete.

Automatic Loading

The manual loading of the glass panel assembly 14 can be changed and automated in the following manner. When cycle start switch 518 is depressed, computer control module 702 turns on solid state relay 706 which then turns on the glass advance solenoid 820 thereby activating the glass advance pneumatic slides 110 and 116, which pushes the glass panel assembly 14 into the glass advance assembly 400 and into the input rollers 112. Computer control module 702 being connected to solid state relay 706 then turns on DC motor controller 718, for turning on the glass advance servomotor 408. Glass advance servomotor 408 then turns the tension pulley 420 which is connected to the glass advance belt 414. Belt 414 turns the glass advance pulleys 412 which in turn, turns rollers 112 and moves glass panel assembly 14 to the right towards rollers 204 and 224. When glass advance sensor 1214 senses glass panel assembly 14, the servomotor 112 turns drive chain 1114 which then turns gear/sprockets 1116 and thereby turning rollers 204 and 224. The glass panel assembly 14 movement continues to the right until the glass panel assembly 14 has reached the horizontal glass sensor 1206. At this point, the computer control module 702 turns off the solid state relay 706 which turns off DC motor controller 718 which turns off the glass advance servomotor 408. Simultaneously, the solid state relay 706 turns off glass advance solenoid 820, which disengages glass advance slides 110 and 116 and moves glass advance assembly 400 down, and away from the rollers 112. At this point, the operation of apparatus 10 continues as described above.

Pinch Roller Adjustment

To adjust the machine apparatus 10 for different thickness glass panels 16 and 18 of glass panel assembly 14, the pinch roller assembly 200 will adjust the distance between the pinch rollers 204 and 224 for determining the proper squeeze and thereby the pressure required to move the glass panel assembly 14 horizontally through the pinch roller assembly 200. For different thicknesses of glass panel assemblies 14, the distance between the front set of rollers 204 and the back set of rollers 224 must be changed. The rollers are adjusted by turning pinch adjusting wheel handle 216 which then turns sprockets 214. Sprockets 214 are connected by chain tensioner 222. Sprockets 214 are also connected to ball screws 220 and through ball nuts 210. Sprockets 214 turn ball screws 220, such that the front rollers 204 being connected to outer roller mounting angles 212 will change their distance form the rear rollers 224.

Output Carriage

Output roller (carriage) assembly 600 is adjustable for different thicknesses of glass panel assemblies 14. By turning hand wheel 616 this causes sprocket pulleys 612 to turn ball screws 504, which changes the distance between the output tapered rollers 608 and the output frame assembly 500, thereby allowing the tapered rollers 608 to engage the glass panel assembly 14 on the outside edge of the glass pane 18 eliminating any sealant material 12 contact with the output tapered rollers 608.

Operational Conditions

Figure 16A:
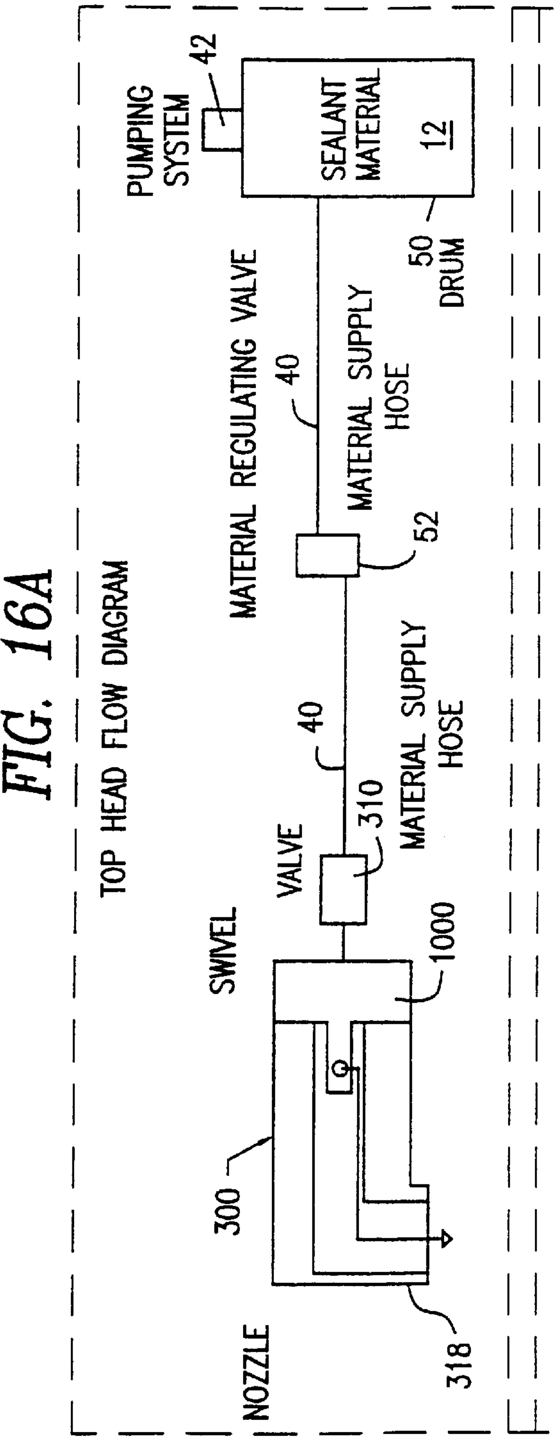
FIG. 16A is a schematic diagram of the automated glass sealing apparatus of the present invention showing the top dispensing head flow diagram of sealant material passing through the upper dispensing head assembly.
Figure 16B:
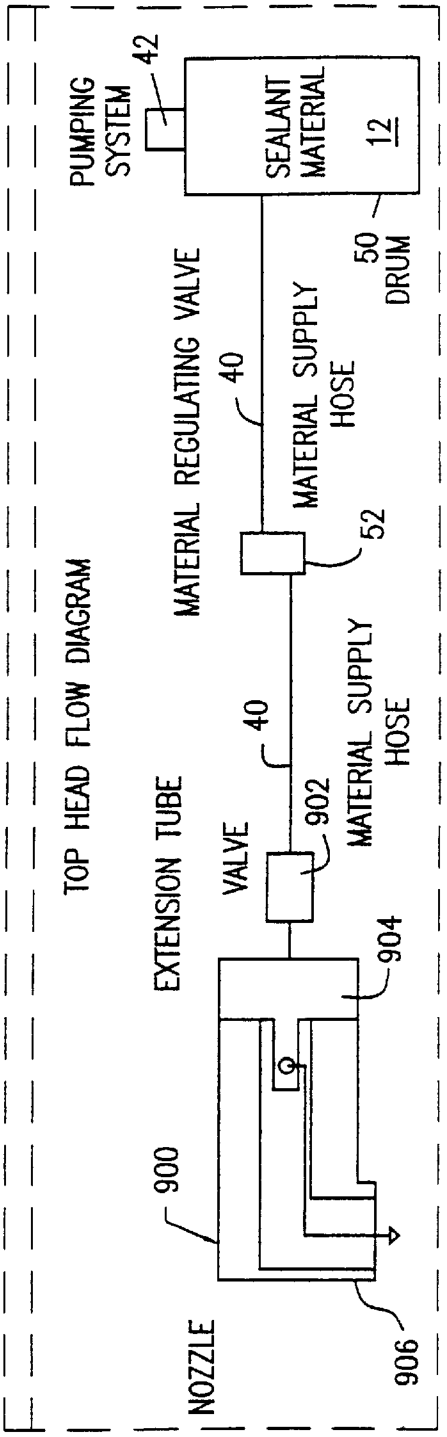
FIG. 16B is a schematic diagram of the automated glass sealing apparatus of the present invention showing the bottom dispensing head flow diagram of sealant material passing through the lower dispensing head assembly.

This system can also be used in the both directions, from left to right, as well as, right to left. Neither the left-to-right motion, nor the counterclockwise (versus clockwise) motion is vital to the operation of this machine apparatus 10. Sealant material 12 is stored in 55 gal drums 50. In operational use, the sealant material 12 flows from the insert pipe 48 within the drum 50 via pump 42 through material supply hoses 40, as shown in FIGS. 16A and 16B of the drawings. Sealant material 12 flow is regulated by a material regulating valve 52, where then the sealant material 12 flows through material supply hoses 40 and is then simultaneously delivered to valves 310 and 902 of the upper and lower dispensing head assemblies 300 and 900, respectively. The sealant material 12 is then ready to be dispersed through nozzles 318 and 906 to the air spaces 28 of spacer frame 20 of the glass panel assembly 14, as shown in FIG. 15 of the drawings. Supply hoses 40 are equipped with quick disconnect fittings 46 for quick removal or setting-up of drums 50 having sealant material 12 therein. Sealant material 12 is monitored by pressure regulators 44 and material regulating valves 52, as shown in FIGS. 1, 16A and 16B of the drawings.

Advantages of the Present Invention

Accordingly, an advantage of the present invention is that it provides for an improved apparatus that automatically applies sealant material around the perimeter of an insulated glass assembly consisting of two panels of glass separated by a spacer.

Another advantage of the present invention is that it provides for an apparatus that automatically applies sealant material in an insulated glass assembly wherein the apparatus automatically or manually changes its alignment criteria for different sizes of air spaces, and allows for differences in the sealant space caused by improper positioning of the spacer when manufacturing the insulated glass assembly.

Another advantage of the present invention is that it provides for an apparatus that automatically applies sealant material in an insulated glass assembly wherein the apparatus includes a vertical or horizontal platform having a plurality of input rollers thereon, and a pair of motorized dispensing nozzle heads having automatic valving thereon.

Another advantage of the present invention is that it provides for an apparatus that automatically applies sealant material in an insulated glass assembly, wherein the apparatus contains two (2) sets of dispensing nozzle heads, so that one of the sets of dispensing nozzle heads moves around three (3) sides of the insulated glass assembly to apply the sealant material, and the other dispensing nozzle head moves along the fourth side of the insulated glass assembly to apply the sealant material thereto.

Another advantage of the present invention is that it provides for an apparatus that automatically applies sealant material in an insulated glass assembly wherein the apparatus further includes heated nozzles for keeping a corner hot during the application of the hot sealant material between the space formed by the pair of glass panels in order to avoid a cold joint during the sealing operation which provides a more uniform sealant application.

Another advantage of the present invention is that it provides for an apparatus that automatically applies sealant material in an insulated glass assembly wherein the apparatus also includes automatic (non-contact) size detection sensors for measuring the width and height of the insulated glass unit as it is being sealed.

Another advantage of the present invention is that it provides for an apparatus that automatically applies sealant material in an insulated glass assembly wherein the apparatus additionally includes a pair of pinch rollers thereon for keeping the insulated glass unit together in order to avoid sealant material from entering the air space between the glass panels and also provides for the lateral movement of the glass panels during the sealing process.

Another advantage of the present invention is that it provides for an apparatus that automatically applies sealant material in an insulated glass assembly wherein the dispensing nozzle heads are designed to change the alignment of the apparatus for different sizes of air spaces in order to eliminate expensive, complex and elaborate motion detector systems.

Another advantage of the present invention is that it provides for an apparatus that automatically applies sealant material in an insulated glass assembly wherein the dispensing nozzle heads are also designed to allow for differences in the sealant space which are caused by improper positioning of the spacer in order to eliminate the need for expensive, complex and elaborate space feedback sensors or space feedback mechanisms in the sealant applying apparatus of the present invention.

Another advantage of the present invention is that it provides for an apparatus that automatically applies sealant material in an insulated glass assembly wherein the dispensing nozzle heads, being at least two, allows for faster sealing of the insulated glass assembly as both the top and bottom sides of the glass assembly are sealed simultaneously using the two dispensing nozzle heads.

Another advantage of the present invention is that it provides for an apparatus that automatically applies sealant material in an insulated glass assembly which works for different sizes, shapes and thicknesses of glass units, with the benefit of increased efficiency due to lower maintenance and labor costs during change-overs for different sizes, shapes or thicknesses of the insulated glass assembly.

Another advantage of the present invention is that it provides for an apparatus that automatically applies sealant material in an insulated glass assembly that utilizes an integrated electrical system which automatically adjusts for the glass unit thickness chosen, thereby effectively eliminating operator error and variations for the different glass unit thicknesses of the insulated glass assembly being produced.

Another advantage of the present invention is that it provides for an apparatus that automatically applies sealant material in an insulated glass assembly that minimizes down time and labor costs by enabling quick removal of jams, defective glass units or misapplied sealant materials to the glass unit during the operational use of the apparatus.

Another advantage of the present invention is that it provides for an apparatus that automatically applies sealant material in an. insulated glass assembly that minimizes change-over time and set-up time by automatically and simultaneously adjusting the positions of the dispensing nozzle heads in regard to the glass units being processed.

A further advantage of the present invention is that it provides for an apparatus that automatically applies sealant material in an insulated glass assembly that is simple to manufacture and assemble and is also more cost efficient during operational use.

A latitude of modification, change, and substitution is intended in the forgoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An apparatus for applying sealant material to a spacer within an insulated glass panel assembly having first, second, third and fourth edges and corners for receiving sealant material therein, comprising:

a) a sealant assembly for applying sealant material to exterior surfaces of a spacer within an insulated glass panel assembly;

b) first means for applying pressure to and for simultaneously moving the insulated glass panel assembly to said sealant assembly for applying sealant material thereto;

c) said sealant assembly for applying sealant material including a first sealant dispensing assembly having a first dispensing nozzle thereon and a second and separate sealant dispensing assembly having a second and separate dispensing nozzle thereon separate from said first sealant dispensing assembly;

d) second means for moving said first sealant dispensing assembly in a first direction for applying sealant material to the spacer along the first edge of the insulated glass panel assembly, and after movement of the glass panel assembly to a second position, for moving said first sealant dispensing assembly in a second and opposite direction parallel to said first direction for applying sealant material to the spacer along the third edge of the insulated panel assembly;

e) third means including a pinch roller drive assembly for applying pressure to and for simultaneously moving the insulated glass panel assembly forward through said sealant assembly to said second position while said first and second sealant dispensing assemblies are applying sealant material to the spacer along the second and fourth edges of the insulated glass panel assembly, respectively; means for automatically adjusting the spacing of said pinch roller drive assembly to receive insulated glass panel assemblies of different thicknesses;

f) fourth means for moving the sealed insulated glass panel assembly out of said sealant assembly; and g) a wiper plate assembly having a wiper plate for wiping off any excess sealant material from the fourth corner of the sealed insulated glass panel assembly, and for wiping off and removing any excess sealant material from said first and second sealant dispensing assemblies.

2. An apparatus for applying sealant material to a spacer within an insulated glass panel assembly having first, second, third and fourth edges and corners for receiving sealant material therein, comprising:

a) a sealant assembly for applying sealant material to exterior surfaces of a spacer within an insulated glass panel assembly;

b) first means for applying pressure to and for simultaneously moving the insulated glass panel assembly to said sealant assembly for applying sealant material thereto;

c) said sealant assembly for applying sealant material including a first sealant dispensing assembly having a first dispensing nozzle thereon and a second and separate sealant dispensing assembly having a second and separate dispensing nozzle thereon separate from said first sealant dispensing assembly;

d) second means for moving said first sealant dispensing assembly in a first direction for applying sealant material to the spacer along the first edge of the insulated glass panel assembly, and after movement of the glass panel assembly to a second position, for moving said first sealant dispensing assembly in a second and opposite direction parallel to said first direction for applying sealant material to the spacer along the third edge of the insulated panel assembly;

e) third means including a pinch roller drive assembly for applying pressure to and for simultaneously moving the insulated glass panel assembly forward through said sealant assembly to said second position while said first and second sealant dispensing assemblies are applying sealant material to the spacer along the second and fourth edges of the insulated glass panel assembly, respectively; means for automatically adjusting the spacing of said pinch roller drive a assembly to receive insulated glass panel assemblies of different thicknesses;

f) fourth means for moving the sealed insulated glass panel assembly out of said sealant assembly;

g) a swivel assembly for moving said first dispensing nozzle of said first sealant dispensing assembly around the second and third corners of the insulated glass panel assembly for applying sealant material thereto, said swivel assembly including a rotatable housing for rotating said first dispensing nozzle of said first sealant dispensing assembly;

h) said swivel assembly including a plurality of heating elements for heating the sealant material within said swivel assembly in order to maintain the sealant material in a fluid form; and i) a wiper plate assembly having a wiper plate for wiping off any excess sealant material from the fourth corner of the sealed insulated glass panel assembly, and for wiping off and removing any excess sealant material from said first and second sealant dispensing assemblies.

3. An apparatus for applying sealant material to a spacer within an insulated glass panel assembly having first, second, third and fourth edges and corners for receiving sealant material therein, comprising:

a) a sealant assembly for applying sealant material to exterior surfaces of a spacer within an insulated glass panel assembly;

b) first means for applying pressure to and for simultaneously moving the insulated glass panel assembly to said sealant assembly for applying sealant material thereto;

c) said sealant assembly for applying sealant material including a first sealant dispensing assembly having a first dispensing nozzle thereon and a second sealant dispensing assembly having a second dispensing nozzle thereon; said second sealant dispensing assembly being separate from said first sealant dispensing assembly; said first sealant dispensing assembly includes a first sealant dispensing valve and first means for actuating said first sealant dispensing valve to apply sealant material from said first dispensing nozzle to the spacer along the first, second and third edges of the insulated glass panel assembly; said second sealant dispensing assembly includes a second sealant dispensing valve and second means for actuating said second sealant dispensing valve to apply sealant material from said second dispensing nozzle to the spacer along the fourth edge of the insulated glass panel assembly;

d) second means for moving said first sealant dispensing assembly in a first direction for applying sealant material to the spacer along the first edge of the insulated glass panel assembly, and after movement of the glass panel assembly to a second position, for moving said first sealant dispensing assembly in a second and opposite direction parallel to said first direction for applying sealant material to the spacer along the third edge of the insulated glass panel assembly;

e) third means including a pinch roller drive assembly for applying pressure to and for simultaneously moving the insulated glass panel assembly forward through said sealant assembly to said second position while said first and second sealant dispensing assemblies are applying sealant material to the spacer along the second and fourth edges of the insulated glass panel assembly, respectively; means for automatically adjusting the spacing of said pinch roller drive assembly to receive insulated glass panel assemblies of different thicknesses;

f) fourth means for moving the sealed insulated glass panel assembly out ofsaid sealant assembly; and g) a swivel assembly for moving said first dispensing nozzle of said first sealant dispensing assembly around the second and third corners of the insulated glass panel assembly for applying sealant material thereto, said swivel assembly including a rotatable housing for rotating said first dispensing nozzle of said first sealant dispensing assembly.

4. An apparatus for applying sealant material in accordance with claim 1, wherein said rotatable housing of said swivel assembly includes means for turning said first dispensing nozzle around the second and third corners of the insulated glass panel assembly, said means for turning includes a servomotor for turning said swivel assembly for rotating said first dispensing nozzle of said first sealant dispensing assembly in an arc of 90° degrees to turn around the second and third comers of the insulated glass panel assembly.

5. An apparatus for applying sealant material in accordance with claim 1, further including a third sensor for sensing when said first sealant dispensing assembly passes said third sensor for shutting down said apparatus.

6. An apparatus for applying sealant material in accordance with claim 1, further including a fourth sensor for sensing when said first sealant dispensing assembly is in position at the leading edge of the second edge of the insulated glass panel assembly for applying sealant material to the second edge of the insulated glass panel assembly from said first sealant dispensing assembly.

7. An apparatus for applying sealant material in accordance with claim 1, wherein said second sealant dispensing assembly includes a dispensing slide valve; and further including a third solenoid for actuating said dispensing slide valve for lowering or raising said second sealant dispensing assembly to a start position on the fourth edge of the insulated glass panel assembly.

8. An apparatus for applying sealant material in accordance with claim 1, wherein said swivel assembly includes a plurality of heating elements for heating the sealant material within said swivel assembly in order to maintain the sealant material in a fluid form.

9. An apparatus for applying sealant material in accordance with claim 1, wherein said second means for moving said first sealant dispensing assembly includes an upper head slide sub-assembly for moving said first sealant dispensing assembly in a first direction and in a second direction.

10. An apparatus for applying sealant material in accordance with claim 9, further including a second sensor for sensing when said first sealant dispensing assembly is in the initial start position on said upper head slide sub-assembly within said sealant assembly.

11. An apparatus for applying sealant material in accordance with claim 1, wherein said pinch roller drive assembly includes a front set of pinch rollers and a rear set of pinch rollers; and wherein said means for automatically adjusting the spacing of said pinch roller drive assembly includes a pinch adjusting wheel for changing the distance between said front set of pinch rollers and said rear set of pinch rollers for receiving different thicknesses of insulated glass panel assemblies.

12. An apparatus for applying sealant material in accordance with claim 11, further including a fifth sensor for sensing when the sealed insulated glass panel assembly passes said fifth sensor for starting said servomotor for rotating said front set and said rear set of pinch rollers for advancing the sealed insulated glass panel assembly through said sealant assembly.

13. An apparatus for applying sealant material in accordance with claim 1, further including a first sensor for sensing the leading edge of the insulated glass panel assembly at said sealant assembly and for actuating the dispensing of sealant material to the leading edge of the insulated glass panel assembly.

14. An apparatus for applying sealant material in accordance with claim 13, wherein said first sensor also senses the trailing edge of the insulated glass panel assembly that has been sealed with sealant material.

15. An apparatus for applying sealant material in accordance with claim 1, wherein said first sealant dispensing assembly includes a first sealant dispensing valve; and further including a first solenoid for actuating said first sealant dispensing valve to apply sealant material to the insulated glass panel assembly.

16. An apparatus for applying sealant material in accordance with claim 15, wherein said second sealant dispensing assembly includes a second sealant dispensing valve; and further including a second solenoid for actuating said second sealant dispensing valve to apply sealant material to the insulated glass panel assembly.

17. An apparatus for applying sealant material in accordance with claim 1, further including a wiper plate assembly having a wiping air knife and wiper plate for wiping off any excess sealant material from the final corner of the sealed insulated glass panel assembly, and for wiping off and removing any excess sealant material from said first and second sealant dispensing assemblies.

18. An apparatus for applying sealant material in accordance with claim 17, further including a sixth solenoid for actuating said wiper plate assembly.

19. An apparatus for applying sealant material in accordance with claim 1, wherein said first means for moving includes a glass advance assembly for advancing and moving forward the insulated glass panel assembly into said sealant assembly.

20. An apparatus for applying sealant material in accordance with claim 19, further including infeed slides and a fourth solenoid for actuating said infeed slides to push against said glass advance assembly for moving the insulated glass panel assembly forward into said pinch roller drive assembly of said sealant assembly.

21. An apparatus for applying sealant material in accordance with claim 19, wherein said pinch roller drive assembly includes a drive chain and chain tension air cylinder; and further including a fifth solenoid for actuating said chain tension air cylinder for maintaining a constant tension on the pinch roller drive chain of said pinch roller drive assembly.

22. An apparatus for applying sealant material in accordance with claim 1, wherein said fourth means for moving includes an output roller assembly for moving the sealed insulated glass panel assembly out of said sealant assembly.

23. An apparatus for applying sealant material in accordance with claim 22, further including means for adjusting the spacing of said output roller assembly for receiving insulated glass panel assemblies of different thicknesses.

24. An apparatus for applying sealant material in accordance with claim 23, further including an output frame assembly having output tapered rollers; and wherein said means for adjusting the spacing of said output roller assembly includes an adjusting hand wheel for changing the distance between said output tapered rollers and said output frame assembly for receiving different thicknesses of insulated glass panel assemblies.

* * * * *